United States Patent [19]
Mori et al.

[11] Patent Number: 5,629,788
[45] Date of Patent: May 13, 1997

[54] LIQUID CRYSTAL DEVICE PROVIDING TILT ANGLE INCLINATION ANGLE AND PS SATISFYING RELATIONSHIPS AT 55 DEGREES

[75] Inventors: Shosei Mori, Hiratsuka; Masataka Yamashita, Chigasaki; Kazuharu Katagiri, Tama; Masahiro Terada; Syuji Yamada, both of Atsugi; Hiroshi Mizuno, Zama, all of Japan

[73] Assignee: Canon Kabushiki Kaisha, Tokyo, Japan

[21] Appl. No.: 174,440

[22] Filed: Dec. 28, 1993

[30] Foreign Application Priority Data

Dec. 29, 1992 [JP] Japan .................... 4-361354

[51] Int. Cl.$^6$ .................... G02F 1/13
[52] U.S. Cl. .................... 349/172; 349/184
[58] Field of Search .................... 359/100, 104

[56] References Cited

U.S. PATENT DOCUMENTS

| | | | |
|---|---|---|---|
| 4,367,924 | 1/1983 | Clark et al. | 350/334 |
| 4,712,875 | 12/1987 | Tsuboyama et al. | 350/344 |
| 4,778,259 | 10/1988 | Kitayama et al. | 350/350 S |
| 4,820,026 | 4/1989 | Okada et al. | 350/341 |
| 4,844,597 | 7/1989 | Katagiri et al. | 350/350 S |
| 4,883,344 | 11/1989 | Okada et al. | 350/339 R |
| 5,189,536 | 2/1993 | Hanyu et al. | 359/100 |
| 5,204,766 | 4/1993 | Taniguchi et al. | 359/100 |
| 5,223,963 | 6/1993 | Okada et al. | 359/78 |
| 5,231,528 | 7/1993 | Escher et al. | 359/100 |
| 5,305,131 | 4/1994 | Terada et al. | 359/100 |
| 5,333,075 | 7/1994 | Harada et al. | 359/100 |
| 5,373,380 | 12/1994 | Harada et al. | 359/100 |
| 5,381,256 | 1/1995 | Hanyu et al. | 359/100 |
| 5,422,748 | 6/1995 | Yamashita et al. | 359/103 |

FOREIGN PATENT DOCUMENTS

| | | |
|---|---|---|
| 56-107216 | 8/1981 | Japan . |
| 59-193426 | 11/1984 | Japan . |
| 59-193427 | 11/1984 | Japan . |
| 60-156046 | 8/1985 | Japan . |
| 60-156047 | 8/1985 | Japan . |

OTHER PUBLICATIONS

Nakano et al., Jap. J. App. Phys., vol. 19, No. 10 (1980) 2013–4.

Schadt et al., Appl. Phys. Lett., vol. 18, No. 4 (1971)127–8.

*Primary Examiner*—Anita Pellman Gross
*Assistant Examiner*—Toan Ton
*Attorney, Agent, or Firm*—Fitzpatrick, Cella, Harper & Scinto

[57] ABSTRACT

A liquid crystal device including: a pair of substrates and a chiral smectic liquid crystal disposed between the pair of substrates. Each of the pair of substrates has an electrode for applying a voltage to the liquid crystal. The pair of substrates is provided with respective uniaxial alignment axes extending in directions which are parallel to each other or intersect each other at a prescribed angle. The chiral smectic liquid crystal is placed in such an alignment state that the liquid crystal assumes at least two stable states and provides a pretilt angle $\alpha$ (degrees), a tilt angle $H$ (degrees), an inclination angle $\delta$ (degrees) of the liquid crystal layer, and an apparent tilt angle $\theta a$ satisfying the following relationships (I) and (II) in a temperature range of 10°–55° C.:

$$H < \alpha + \delta \text{ and } \delta < \alpha \quad \text{(I), and}$$

$$H > \theta a > H/2 \quad \text{(II).}$$

The liquid crystal provides a tilt angle $H$ (degrees), an inclination angle $\delta$ (degrees) of the liquid crystal layer, and a spontaneous polarization Ps (nC/cm$^2$) satisfying the following relationships (III) and (IV) at 55° C.:

$$H \times \delta > 70 \quad \text{(III), and}$$

$$H \times \delta / Ps > 20 \quad \text{(IV).}$$

12 Claims, 8 Drawing Sheets

C1 ALIGNMENT $H + \delta > \alpha$

C2 ALIGNMENT $H - \delta > \alpha$

C1 ALIGNMENT  $H + \delta > \alpha$

C2 ALIGNMENT  $H - \delta > \alpha$

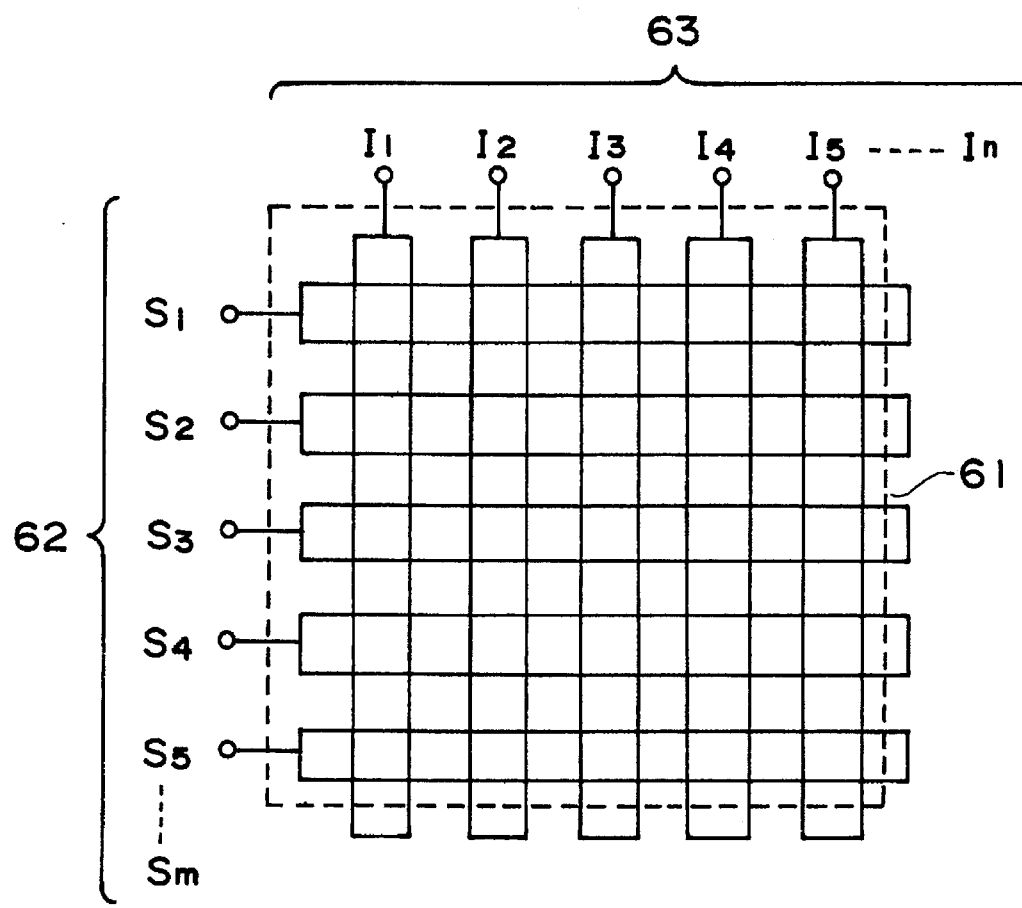
F I G. 6

LIQUID CRYSTAL DEVICE PROVIDING TILT ANGLE INCLINATION ANGLE AND PS SATISFYING RELATIONSHIPS AT 55 DEGREES

FIELD OF THE INVENTION AND RELATED ART

The present invention relates to a liquid crystal device for use in a liquid crystal display apparatus, a liquid crystal-optical shutter, etc., more particularly to a liquid crystal device using a chiral smectic liquid crystal having spontaneous polarization.

Hitherto, liquid crystal devices have been used as electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses.

On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where a scanning electrode is not selected and a signal electrode is selected (which regions are so called "half-selected points").

If the difference between a voltage applied to the selected points and a voltage applied to half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N.

Accordingly, the larger the number of scanning lines are, the smaller is the voltage difference of an effective value applied to a selected point and non-selected points when scanning is repeatedly effected. This leads to unavoidable drawbacks of lowering of image contrast or occurrence of interference or crosstalk.

These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect.

To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. (JP-A). 56-107216, U.S. Pat. No. 4,367,924, etc.). In this instance, as the liquid crystals having bistability, ferroelectric liquid crystals having chiral smectic C-phase (SmC*) or H-phase (SmH*) are generally used.

These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric field and retaining the resultant state in the absence of an electric field.

In addition to the above-described characteristic of showing bistability, the ferroelectric liquid crystal has an excellent property, i.e., high-speed responsiveness. This is due to the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected.

A simple matrix-type display apparatus using a liquid crystal device comprising a ferroelectric liquid crystal disposed between a pair of substrates as described above may be driven by driving methods as disclosed by, e.g., JP-A 59-193426, JP-A 59-193427, JP-A 60-156046 and JP-A 60-156047.

FIGS. 5A and 5B are waveform diagrams showing an example set of driving waveforms used in such a driving method. FIG. 6 is a plan view showing an electrode matrix used in a ferroelectric liquid crystal panel 61 of a simple matrix-type. The liquid crystal panel 61 shown in FIG. 6 includes scanning electrodes 62 and data electrodes 63 intersecting each other so as to constitute a pixel at each intersection together with a ferroelectric liquid crystal disposed between the scanning electrodes 62 and data electrodes 63.

Referring to FIG. 5A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 5B shows a time-serial waveform used for providing a display state as shown in FIG. 7.

In the driving embodiment shown in FIGS. 5A and 5B, a minimum duration Δt of a single polarity voltage applied to a pixel on a selected scanning line corresponds to the period of a writing phase $t_2$, and the period of a one-line clearing phase $t_1$ is set to 2Δt.

The parameters $V_S$, $V_I$ and Δt in the driving waveforms shown in FIGS. 5A and 5B are determined depending on the switching characteristics of the ferroelectric liquid crystal material used.

FIG. 8 shows a V–T characteristic, i.e., a change in transmittance T when a driving voltage denoted by ($V_S$+$V_I$) is changed while a bias ratio as mentioned hereinbelow is kept constant. In this embodiment, the parameters are fixed at constant values of Δt=50 μs and a bias ratio $V_I/(V_I+V_S)$ =⅓. On the right side of FIG. 8 is shown a result when the voltage ($I_N$–$S_S$) shown in FIG. 5A is applied to a pixel concerned, and on the left side of FIG. 8 is shown a result when the voltage ($I_S$–$S_S$) is applied to a pixel concerned, respectively while increasing the voltage ($V_S$+$V_I$). On both sides of the abscissa, the absolute value of the voltage ($V_S$+$V_I$) is separately indicated. Herein, a voltage $V_1$ denotes the absolute value of ($V_S$+$V_I$) required for switching from a white state to a black state by applying a voltage signal $V_B^2$ shown in FIG. 5A, a voltage $V_2$ denotes the absolute value of ($V_S$+$V_I$) required for switching (resetting) a black state to a white state by applying a voltage $V_R$ at $I_N$–$S_S$, and a voltage $V_3$ is the value of ($V_S$+$V_I$) beyond which a pixel concerned written in white is unexpectedly inverted into a black state by applying a voltage $V_B^1$ at $I_n$–$S_S$ in FIG. 5A. In this instance, a relationship of $V_2<V_1<V_3$ holds. The voltage $V_1$ may be referred to as a threshold voltage in actual drive and the voltage $V_3$ may be referred to as a crosstalk voltage. Such a crosstalk voltage $V_3$ is generally present in actual matrix drive of a ferroelectric liquid crystal device. In an actual drive, ΔV=($V_3$–$V_1$) provides a range of |$V_S$+$V_I$| allowing a matrix drive and may be referred to as a (driving) voltage margin, which is preferably large enough. It is of course possible to increase the value of $V_3$ and thus ΔV (=$V_3$–$V_1$) by increasing the bias ratio (i.e., by causing the bias ratio to approach unity). However, a large bias ratio corresponds to a large amplitude of a data signal and leads to an increase in flickering and a lower contrast, thus being undesirable in respect of image quality. According to our study, a bias ratio of about ⅓–¼ was practical. On the other hand, when the bias ratio is fixed, the voltage margin ΔV strongly depends on the switching characteristics of a liquid crystal material used, and it is needless to say that a liquid crystal material providing a large ΔV is very advantageous for matrix drive.

The upper and lower limits of application voltages and a difference therebetween (driving voltage margin ΔV) by which selected pixels are written in two states of "black" and "white" and non-selected pixels can retain the written "black" and "white" states at a constant temperature as described above, vary depending on and are inherent to a particular liquid crystal material used. Further, the driving margin is deviated according to a change in environmental temperature, so that optimum driving voltages should be set in an actual display apparatus according to a liquid crystal material used and an environmental temperature.

In a practical use, however, when the display area of a matrix display apparatus is enlarged, the differences in environmental conditions (such as temperature and cell gap between opposite electrodes) naturally increase, so that it becomes impossible to obtain a good quality of image over the entire display area by using a liquid crystal material having a small driving voltage margin.

Generally, in a liquid crystal device utilizing birefringence of a liquid crystal, the transmittance under right angle cross nicols is given by the following equation (1):

$$I/I_0 = \sin^2 4\theta a \cdot \sin^2(\Delta n d/\lambda)\pi \qquad (1),$$

wherein $I_0$: incident light intensity,

I: transmitted light intensity,

θa: apparent tilt angle,

Δn: refractive index anisotropy, d: thickness of the liquid crystal layer,

λ: wavelength of the incident light.

The apparent tilt angle θa in the above-mentioned non-helical structure is recognized as a half of an angle between the average molecular axis directions of liquid crystal molecules in a twisted alignment in a first orientation state and a second orientation state. According to the above equation, it is shown that an apparent tilt angle θa of 22.5 degrees provides a maximum transmittance and the apparent tilt angle θa in a non-helical structure for realizing bistability should desirably be as close as possible to 22.5 degrees in order to provide a high transmittance and a high contrast.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, it has been found that an apparent tilt angle θa (a half of an angle formed between molecular axes at two stable states) in a ferroelectric liquid crystal with a non-helical structure obtained by alignment with an alignment control film of the prior art has become smaller as compared with a a tilt angle Ⓗ (the angle Ⓗ is a half of the apex angle of the cone shown in FIG. 3A as described below) in the ferroelectric liquid crystal having a helical structure. Particularly, the apparent tilt angle θa in a ferroelectric liquid crystal with a non-helical structure obtained by alignment with alignment control films of the prior art was found to be generally on the order of 3–8 degrees, and the transmittance at that time was at most about 3 to 5%.

In order to realize a display device comprising a chiral smectic liquid crystal disposed to have a large apparent tilt angle θa in a non-helical structure and capable of displaying a high contrast image, there has been discovered the following.

That is, it has been clarified that it is possible to realize a display providing a high contrast image by using a liquid crystal device, comprising: a pair of substrates, and a chiral smectic liquid crystal disposed between the substrates, each of the facing surfaces of substrates having thereon an electrode for applying a voltage to the liquid crystal and a uniaxial alignment film for aligning the liquid crystal; wherein the alignment films on the substrates are provided with uniaxial alignment axes which cross each other at a prescribed angle and the chiral smectic liquid crystal is disposed in such an alignment state that the liquid crystal shows a pretilt angle α, a tilt angle Ⓗ, and an inclination angle δ of the liquid crystal layer (i.e., an angle formed by the liquid crystal layer line and a normal to the substrate) satisfying relationships (2):

$$\text{H} < \alpha + \delta \text{ and } \delta < \alpha \quad (2),$$

and such an alignment state includes at least two stable states in which an apparent tilt angle θa and the tilt angle H satisfies a relationship (3):

$$\text{H} > \theta a > \text{H}/2 \quad (3).$$

More specifically, a smectic liquid crystal generally has a layer structure and, due to a shrinkage of spacing between layers when it causes a transition from smectic A phase (SmA) to chiral smectic C phase (SmC*), it assumes a chevron structure as shown in FIG. 2 where the layers 21 are bent at a mid point between a pair of substrates 24a and 24b.

There are two alignment states depending on the bending directions as shown in FIG. 2, including a C1 alignment state 22 appearing immediately after transition from a higher temperature phase to SmC* phase and a C2 alignment state 23 which appears in mixture with the C2 alignment state on further cooling. It has been further discovered that the above C1, C2 transition does not readily occur when a combination of a specific alignment film and a liquid crystal is used, and the C2 alignment state does not occur at all when a specific liquid crystal is used. Particularly, C1 alignment state provides a very high contrast and C2 alignment state provides a low contrast when an alignment film providing a high pretilt angle a is used and a liquid crystal is placed in such an alignment state that the relationship of: $\text{H} < \alpha + \delta$ is satisfied. Accordingly, it is expected that a display with a higher quality can be realized by using a display device wherein the entire display area is formed in C1 alignment state and the high contrast two states in the C1 alignment state are used as two states representing white and black display states.

In order to realize C1 alignment state without yielding C2 alignment state as described above, the following conditions are required.

Referring to FIGS. 3A and 3B, directions in the vicinity of the substrates in the C1 alignment and C2 alignment are disposed on cones 31 shown in FIGS. 3A and 3B, respectively. As is well known, as a result of rubbing, liquid crystal molecules contacting a substrate surface form a pretilt angle α, the direction of which is such that the liquid crystal molecules 32 raise a forward end up (i.e., spaced from the substrate surface) in the direction of the rubbing indicated by an arrow A (as shown also in FIG. 2). From the above, it is required that the following relationships (4) are satisfied among a cone angle H, the pretilt angle a and a layer inclination angle δ:

$$\text{H} + \delta > \alpha \text{ in C1 alignment, and}$$
$$\text{H} - \delta > \alpha \text{ in C2 alignment} \quad (4).$$

Accordingly, the condition for preventing the formation of C2 alignment but allowing C1 alignment is $\text{H} - \delta < \alpha$, that is $$\text{H} < \alpha + \delta \quad (5).$$

Further, from simple consideration of a torque acting on a liquid crystal molecule at a boundary surface in switching from one position to the other position under an electric field, the relationship of $\alpha > \delta$ ... (6) is given as a condition for easy switching of such a liquid crystal molecule at the boundary.

Accordingly, in order to form the C1 alignment more stably, it is effective to satisfy the condition (6) in addition to the condition (5).

From further experiments under the conditions of (5) and (6), the apparent tilt angle δa is increased from 3–8 degrees obtained when the conditions (5) and (6) are not satisfied to 8–16 degrees when the conditions (5) and (6) are satisfied according to the present invention, and also an empirical relationship of $\text{H} > \theta a > \text{H}/2$ ... (7) has been also found.

As described above, satisfaction of the conditions (5), (6) and (7) provides a display device capable of displaying a high-contrast image.

When FLC is placed in an alignment state satisfying the above-mentioned relationship (5), there are four states in the C1 alignment state.

FIG. 4 is a schematic view illustrating director positions between the substrates in the respective states in C1 alignment. More specifically, at 41–44 are respectively shown changes in director positions between the substrates in the form of projections of directors onto cone bottoms as viewed from each bottom. At 41 and 42 is shown a splay state, and at 43 and 44 is shown a director arrangement which is believed to represent a uniform alignment state (bistable state). As is understood from FIG. 4, at 43 and 44 representing a uniform state, the molecule position (director) is different from that in the splay state either at the upper substrate or lower substrate. In the uniform state, the directors are believed to be not twisted between the substrates and the relationship (7) is satisfied. As a result, an apparent tilt angle θa of a liquid crystal is increased to realize a high contrast state.

In order to stably form the C1 alignment state and also provide a good alignment characteristic, it is also very effective to perform cross-rubbing, that is, rubbing a pair of substrates in directions intersecting at an angle of 1–25 degrees while the directions A are shown generally parallel in FIG. 2.

In practice, when a liquid crystal device using a ferroelectric (or chiral smectic) liquid crystal is used at an ambient temperature range of 5°–35° C., a temperature of the liquid crystal device per se is increased to about 10°–50° C. due to heat accumulation by peripheral devices or elements. At this stage, the liquid crystal device using a ferroelectric liquid crystal fails to keep good display images at an overall temperature range of 10°–50° C. Particularly, the liquid crystal device has encountered an important problem of ensuring a sufficient driving voltage margin at a higher temperature side. In many cases, a splay alignment state is liable to appear at a higher temperature (e.g., 50° C.) while a good image having a high contrast can be realized at room temperature by the above-mentioned C1 uniform alignment state. As a result, at such a higher temperature, the driving voltage margin is considerably decreased. Thus, a conventional liquid crystal device has come hard to realize a good image and a sufficient driving voltage margin at an overall temperature range (10°–50° C.) for practical use.

SUMMARY OF THE INVENTION

The present invention has accomplished the above-mentioned problems.

An object of the present invention is to provide a liquid crystal device capable of ensuring a sufficient driving temperature margin over at high temperature.

Another object of the present invention is to provide a liquid crystal device capable of preventing occurrence of C2 alignment state even at low temperature.

According to the present invention, there is provided a liquid crystal device, comprising: a pair of substrates and a chiral smectic liquid crystal disposed between the pair of substrates, each of the pair of substrates having thereon an electrode for applying a voltage to the liquid crystal, the pair of substrates being provided with respective uniaxial alignment axes extending in directions which are parallel to each other or intersect each other at a prescribed angle, wherein the chiral smectic liquid crystal is placed in such an alignment state that the liquid crystal assumes at least two stable states and provides a pretilt angle α (degrees), a tilt angle $\widehat{H}$ (degrees), an inclination angle δ (degrees) of the liquid crystal layer, and an apparent tilt angle θa satisfying the following relationships (I) and (II) in a temperature range of 10°–55° C.:

$\widehat{H} < α+δ$ and $δ<α$ (I), $\widehat{H} > θa > \widehat{H}/2$ (II); and the liquid crystal provides a tilt angle $\widehat{H}$ (degrees), an inclination angle δ (degrees) of the liquid crystal layer, and a spontaneous polarization Ps (nC/cm$^2$) satisfying the following relationships (III) and (IV) at 55° C.:

$\widehat{H} \times δ > 70$ (III), $\widehat{H} \times δ/Ps > 20$ (IV).

According to the present invention, there is provided a liquid crystal device, comprising: a pair of substrates and a chiral smectic liquid crystal disposed between the pair of substrates, each of the pair of substrates having thereon an electrode for applying a voltage to the liquid crystal, the pair of substrates being provided with respective uniaxial alignment axes extending in directions which are parallel to each other or intersect each other at a prescribed angle, wherein the chiral smectic liquid crystal is placed in such an alignment state that the liquid crystal assumes at least two stable states and provides a pretilt angle α (degrees), a tilt angle $\widehat{H}$ (degrees), an inclination angle δ (degrees) of the liquid crystal layer, and an apparent tilt angle θa satisfying the following relationships (I) and (II) in a temperature range of 10°–55° C.:

$\widehat{H} < α+δ$ and $δ<α$ (I), $\widehat{H} > θa > \widehat{H}/2$ (II); and the liquid crystal provides a tilt angle $\widehat{H}$ (degrees) and an inclination angle δ (degrees) of the liquid crystal layer satisfying the following relationship (VIII) at 10° C.:

$δ > \widehat{H}/3$ (VIII).

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6 is a plan view of an electrode matrix.

DESCRIPTION OF THE PREFERRED EMBODIMENTS

Figure 1:
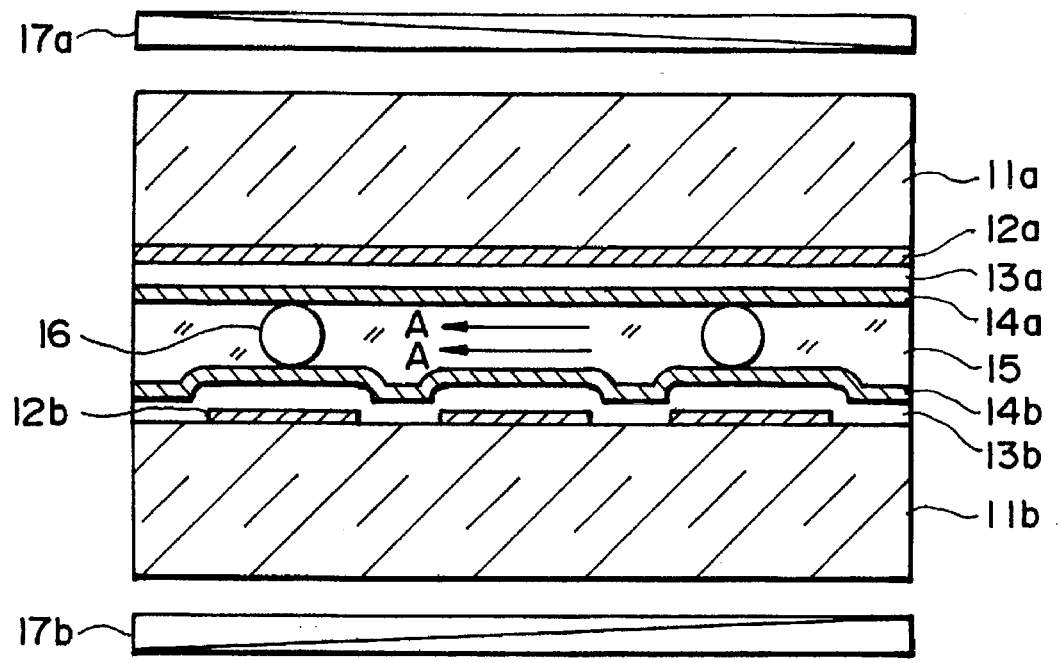
FIG. 1 is a schematic sectional view of an embodiment of the liquid crystal device according to the present invention.
Figure 2:
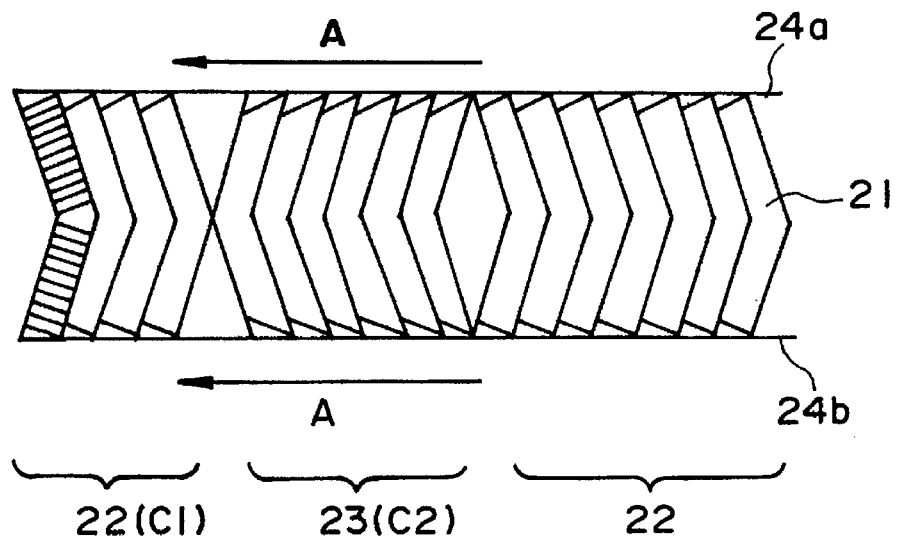
FIG. 2 is an illustration of C1 and C2 alignment states.
Figure 3A:
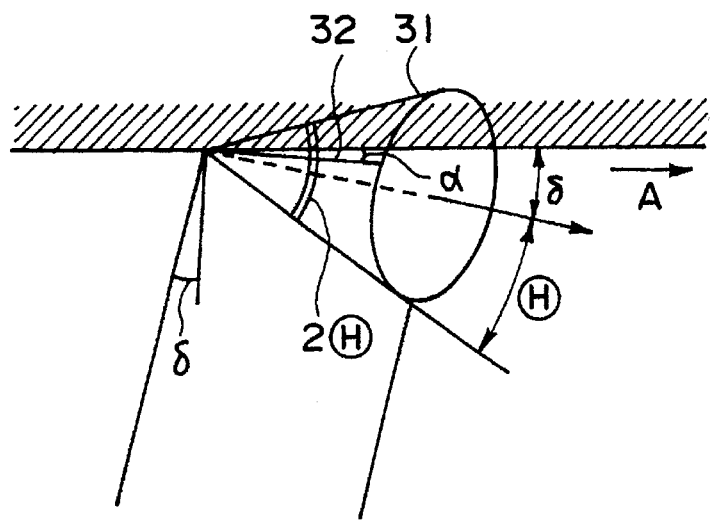
FIGS. 3A and 3B are illustrations of relationship among a tilt angle, a pretilt angle and a layer inclination angle in C1 alignment and C2 alignment, respectively.
Figure 3B:
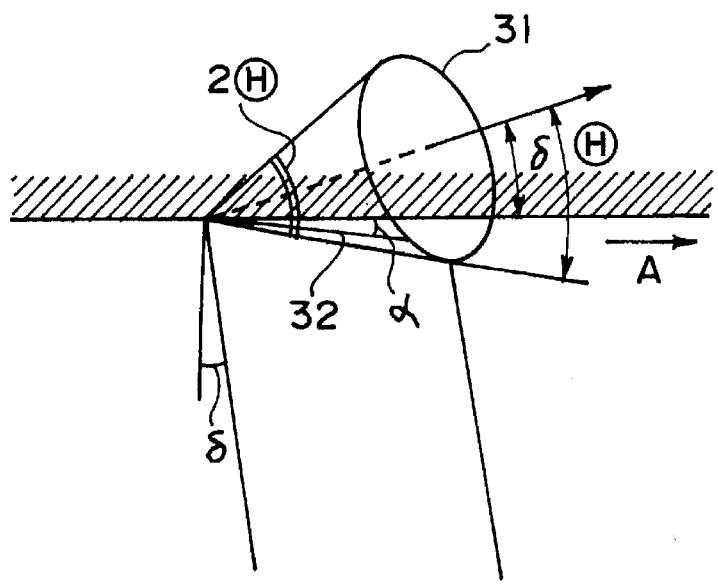
Figure 4:
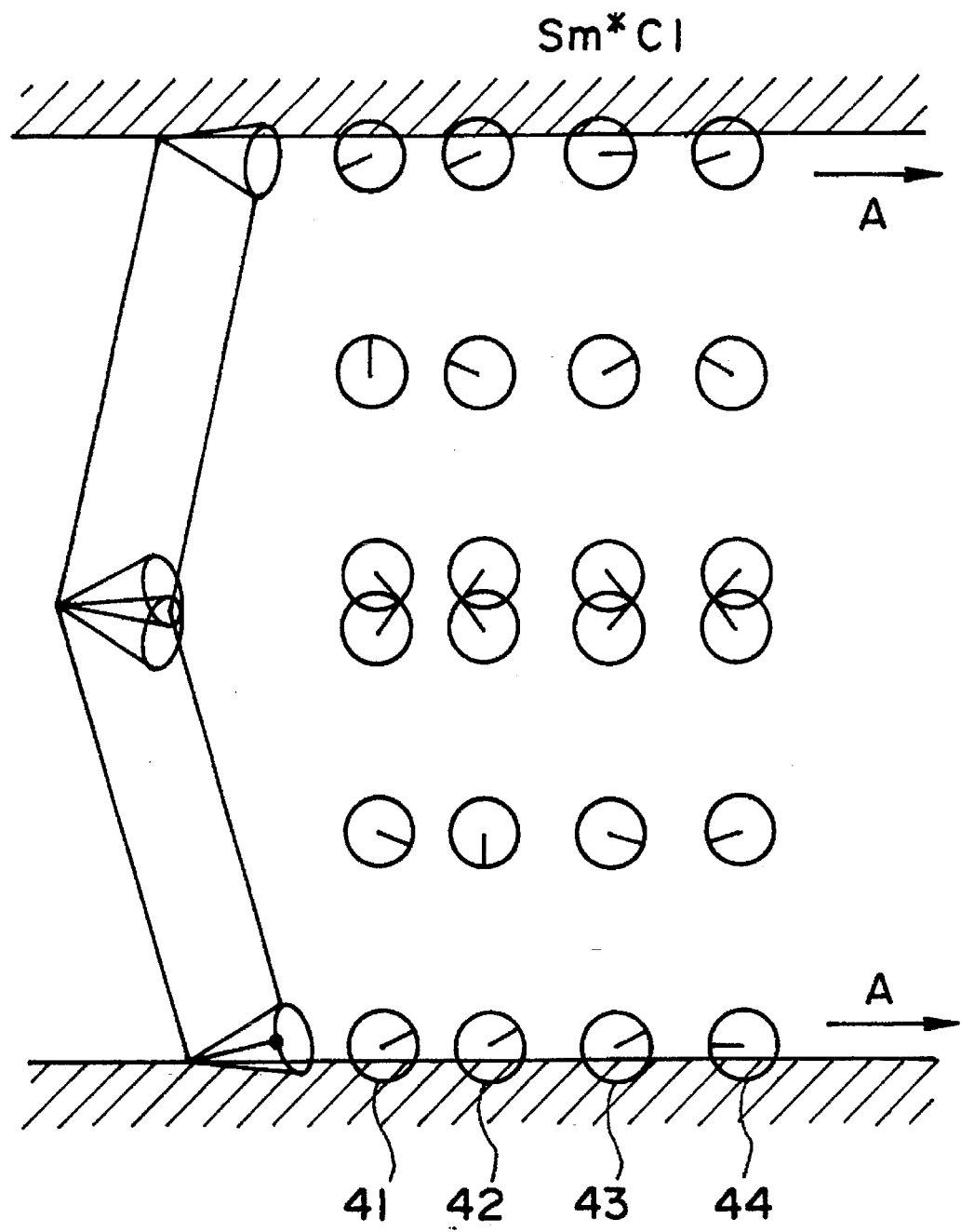
FIG. 4 is a schematic view illustrating director positions between substrates in the respective states in C1 alignment.

As described above, an important factor in a decrease in a driving voltage margin at a higher temperature side of a device temperature (e.g., 10°–50° C.) is that a C1 uniform alignment state becomes unstable and a splay alignment state is liable to appear.

We have found the fact that a C1 uniform alignment state becomes unstable and a driving voltage margin at a higher temperature side is considerably decreased or lost in the case where relationships exist between three physical parameters of a liquid crystal including: (a) an inclination angle δ of a liquid crystal layer showing a clarity of a chevron structure, (b) a tilt angle $\widehat{H}$ being a half of an angle formed by two optical (liquid crystal molecular) axes in two stable states by switching under electric field application, and (c) a spontaneous polarization Ps being an important parameter showing an electrical interaction between substrates and liquid crystal molecules are deviated from certain optimum conditions.

That is, as a result of our various experiments including measurement of high-temperature driving voltage margins for various liquid crystal devices having different device structures and using many liquid crystal compositions, we have found that it is possible to stabilize a C1 uniform alignment state even at high temperature and also to ensure a sufficient high-temperature driving voltage margin when the above-mentioned relationships (III) and (IV) at 55° C. (i.e., $\widehat{H} \times δ > 70$ ... (III), and $\widehat{H} \times δ/Ps > 20$ ... (IV) in addition to the above-mentioned relationships (I) and (II) (i.e., $\widehat{H} < δ+α$ ... (i), and $\widehat{H} > θa > \widehat{H}/2$ ... (II) are satisfied.

The parameters of δ (inclination angle), $\widehat{H}$ (tilt angle) and Ps (spontaneous polarization) at 55° C. may preferably satisfy the following relationships (V) and (VI):

$\widehat{H} \times δ > 90$ (V), and $\widehat{H} \times δ/Ps > 25$ (VI).

Further, the chiral smectic liquid crystal to be used in the present invention may preferably have a phase transition temperature from smectic A phase to chiral smectic C phase of 60° C.

In the present invention, the above-mentioned three parameters with respect to the relationships (III)–(VI) are prescribed as values at 55° C. The reason why a temperature of 55° C. is set is as follows. When a liquid crystal device is used at a higher ambient temperature of 35° C., the temperature of the liquid crystal device is aobut 50° C. At this point, the liquid crystal device is required to provide good image quality and a sufficient driving voltage margin at a temperature higher than about 50° C. in order to ensure those at about 50° C.

We have empirically found that it is possible to ensure a sufficient wider driving voltage margin for displaying good images on condition that a driving voltage margin at 55° C. is at least present and has a value of at least 3.4 V.

As is apparent from the relationship: (I) $\delta<\alpha$ for stabilizing a C1 (uniform) alignment state, a pretilt angle $\alpha$ is required to be large to a certain extent. At this point, a C1 uniform alignment state is stabilized but, in some cases, a splay alignment state appears at a minute area in an area to be occupied by the C1 uniform alignment state similarly to the problem at high temperature. In order to solve such a problem, the following relationship (VII): $\widehat{H}<\alpha$ ... (VII) may preferably be satisfied. When a value of a tilt angle $\widehat{H}$ is deviated from the above relationship (VII), i.e., the value of $\widehat{H}$ is equal to or larger than that of a pretilt angle $\alpha$, a C1 splay alignment state is liable to appear within a C1 uniform alignment area during matrix driving.

In some cases, a minute C2 alignment area other than a C1 uniform alignment area providing good images appears at low temperature (e.g., 10° C.) during matrix driving. This phenomenon is under the considerable influence of driving conditions such as a driving voltage and a frequency. We have found, however, that such a phenomenon only occurs when a value of an inclination angle $\delta$ of a liquid crystal layer is much smaller than the one of a tilt angle $\widehat{H}$. More specifically, the inclination angle $\delta$ and the tilt angle $\widehat{H}$ may preferably satisfy the relationship (VIII): $\delta>\widehat{H}/3$ (at 10° C.) ... (VIII), particularly the relationship (IX): $\delta>\widehat{H}/2$ (at 10° C.) ... (IX).

An embodiment of the liquid crystal device according to the present invention will now be described with reference to FIG. 1 which is a schematic sectional view of the device. Referring to FIG. 1, the liquid crystal device includes a pair of substrates (glass plates) 11a and 11b and a chiral smectic liquid crystal 15 disposed between the substrates. On each opposite face of the substrates, an electrode 12a or 12b for applying a voltage to the liquid crystal is formed and a uniaxial alignment film provided with a uniaxial alignment axis are provided. The alignment axes in respective directions are parallel to each other or intersect each other at a prescribed angle. More specifically, the glass substrates 11a and 11b are coated with the transparent electrodes 12a and 12b, respectively, of $In_2O_3$, ITO (indium tin oxide), etc., then with 200 to 3000 Å-thick insulating films 13a and 13b, respectively, of $SiO_2$, $TiO_2$, $Ta_2O_5$, etc., and further with 50 to 1000 Å-thick polyimide alignment films 14a and 14b.

The insulating film 13a or 13b can be formed, e.g., by coating with a tantalum oxide film by sputtering. On the insulating film, the polyamide alignment film can be formed, e.g., by applying a solution in NMP of a polyamide acid ("LQ1802" mfd. by Hitachi Kasei K.K.) represented by the following formula:

by spin coating, and further by baking the polyamide acid at 270° C. for 1 hour.

The alignment films 14a and 14b are respectively provided with uniaxial alignment axes by rubbing in directions (denoted by arrows A in FIG. 1) which are generally parallel and in the same direction but intersect each other at a clockwise or counter-clockwise angle of 0–25 degrees (herein, referred to as "intersection angle"). The direction of clockwise (or counter-clockwise) intersection angle is determined herein by the direction of rotation of the alignment axis provided to the upper alignment film 14a from the alignment axis provided to the lower alignment film 14b as viewed from the upper substrate 11a.

A spacing between the substrates 11a and 11b is set to a value (e.g., 0.1–3 μm) which is sufficiently small to suppress the formation of a helical structure of the chiral smectic liquid crystal 15, thus resulting in bistable alignment states of the liquid crystal 15. The small spacing is held by spacer beads 16 of, e.g., silica or alumina, dispersed between the substrates. The thus-formed cell structure is sandwiched between a pair of polarizers 17a and 17b to provide a liquid crystal device. In the above liquid crystal device structure, the relationships (I) and (II) described above are satisfied.

The values of tilt angle $\widehat{H}$, apparent tilt angle $\theta a$, liquid crystal layer inclination angle $\delta$, spontaneous polarization Ps and pretilt angle $\alpha$ referred to herein are based on values measured according to the following methods.

Measurement of Tilt Angle $\widehat{H}$

An FLC (ferroelectric liquid crystal) device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A tilt angle $\widehat{H}$ was measured as a half of the angle between the first and second extinct positions.

Measurement of Apparent Tilt Angle $\theta a$

An FLC device sandwiched between right angle cross nicol polarizers was supplied with a single pulse of one polarity exceeding the threshold voltage of the ferroelectric liquid crystal and was then rotated under no electric field horizontally relative to the polarizers to find a first extinction position. Then, the FLC device was supplied with a single pulse of the opposite polarity exceeding the threshold voltage of the ferroelectric liquid crystal and was then rotated under no electric field relative to the polarizers to find a second extinct position. An apparent tilt angle $\theta a$ was measured as a half of the angle between the first and second extinct positions.

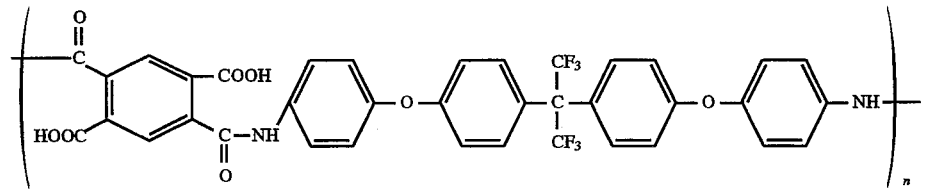

Measurement of Liquid Crystal Layer Inclination Angle δ

The method used was basically similar to the method used by Clark and Largerwal (Japanese Display '86, Sep. 30–Oct. 2, 1986, p.p. 456–458) or the method of Ohuchi et al (J.J.A.P., 27 (5) (1988), p.p. 725–728). The measurement was performed by using a rotating anode-type X-ray diffractometer using CuKα X-rays (available from MAC Science) as a measurement apparatus. An 80 μm-thick glass ("Micro Sheet" available from Corning Glass Works) was used as a glass substrate in order to minimize the X-ray absorption with the glass substrate, otherwise an ordinary step of forming a liquid crystal cell was conducted.

More specifically, in order to obtain a gap or distance between liquid crystal layers, a bulk liquid crystal was applied onto a sample glass. The gap was obtained by effecting 2θ/θ scan in the same manner as in powder X-ray diffraction analysis. A layer inclination angle 6 was measured in the following manner. A cell having a gap of 80 μm was prepared by using a pair of the above-mentioned 80 μm-thick glass substrates and a spacer comprising a 80 μm-thick glass identical to the above substrates. The cell was filled with a liquid crystal at a temperature of isotropic liquid and then gradually cooled while applying a magnetic field to the cell in the direction parallel to the substrates in an electromagnet, thus preparing a sample cell which had been subjected to a homogeneous alignment treatment. An X-ray detector was set to a diffraction angle 2θ providing the above-obtained layer gap and then the sample cell was subjected to θ scan, thus obtaining the layer inclination angle δ according to the above-mentioned method. In this case, the values of δ are inherent in the liquid crystal cells used.

Measurement of Spontaneous Polarization Ps

The measurement was performed according to the triangular wave method.

Measurement of Pretilt Angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

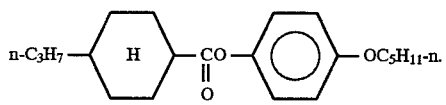

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

Hereinbelow, the present invention will be described more specifically based on Examples to which the present invention is not intended to be limited, however.

EXAMPLE 1

Liquid crystal compositions 1-A, 1-B and 1-D to 1-R were prepared by mixing mesomorphic compounds in the predetermined proportions.

The liquid crystal compositions comprises at least one mesomorphic compound of the following formula:

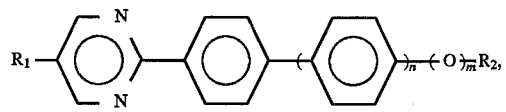

wherein $R_1$ and $R_2$ each is a linear or branched alkyl group, and n and m each is 0 or 1, as a main component.

More specifically, for example, the composition 1-A was prepared by mixing the following compounds in the indicated proportions.

| Structural Formula | wt. parts |
|---|---|
| $C_8H_{17}$—[N-ring]—[ring]—O—$C_{10}H_{21}$ | 9 |
| $C_7H_{15}$—[N-ring]—[ring]—O—$C_9H_{19}$ | 2 |
| $C_9H_{19}$—[N-ring]—[ring]—O—$C_6H_{13}$ | 6 |
| $C_{10}H_{21}$—[N-ring]—[ring]—O—$C_8H_{17}$ | 5 |
| $C_{10}H_{21}$—[N-ring]—[ring]—O—$CH_2$—$\overset{*}{C}H(F)$—$C_6H_{13}$ | 11 |
| $C_7H_{15}$—[N-ring]—[ring]—[ring]—O—$C_7H_{15}$ | 9 |

| Structural Formula | wt. parts |
|---|---|
| C6H13—⌬—C(S)=N—CH=CH—⌬—C9H19 | 9 |
| C6H13—⌬—C(S)=N—CH=CH—⌬—OC(O)—C6H13 | 2 |
| C8H17—⌬—C(S)=N—CH=CH—⌬—OC(O)—C8H17 | 6 |
| C6H13—benzothiazole—⌬—O—C8H17 | 3 |
| C12H25—pyrazine—⌬—OC(O)—⌬—F | 4 |
| C13H27—pyrazine—⌬—OC(O)—⌬—F | 2 |
| C11H23—pyrazine—⌬—OC(O)—⌬(3,4-F2) | 2 |
| C10H21—pyrazine—⌬—(CH2)3—thiophene | 7 |
| C10H21—pyrazine—⌬—benzofuran—CH2—C*H—C8H17 | 3 |

Further, a liquid crystal ("ZLI-3774", mfd. by Merck Co.) was used as a liquid crystal composition 1-C.

The thus prepared liquid crystal compositions 1-A to 1-R showed the following physical properties.

TABLE 1

| L.C. | Phase transition temperature (°C.) | | | | | Ps (nC/cm²) | | H (DEG.) | | δ (DEG.) | |
|---|---|---|---|---|---|---|---|---|---|---|---|
| | Cryst | SmC* | SmA | Ch | Iso | 30° C. | 55° C. | 30° C. | 55° C. | 30° C. | 55° C. |
| 1-A | −19.1 → | −6.4 → / ← −20.2 | ← 70.3 | ← 94.6 | ← 102.7 | 7.8 | 4.5 | 15.4 | 12.8 | 10.7 | 9.3 |
| 1-B | | 0.5 → / ← −15.4 | ← 71.4 | ← 87.5 | ← 96.3 | 8.2 | 5.0 | 26.6 | 17.2 | 18.8 | 12.4 |
| 1-C | | −30 → | 62 → | 76 → | 86 → | 23.5 | 9.0 | 24.6 | 14.3 | 19.0 | 10.3 |
| 1-D | −18.7 → | −7.2 → / ← −20.1 | ← 68.9 | ← 95.5 | ← 103.4 | 6.7 | 3.3 | 15.3 | 12.8 | 10.4 | 9.2 |
| 1-E | | −18.6 → / ← −18.6 | ← 68.6 | ← 94.8 | ← 103.0 | 5.4 | 2.6 | 14.5 | 10.5 | 9.4 | 7.5 |
| 1-F | | −4.0 → / ← −10.6 | ← 74.5 | ← 96.0 | ← 105.2 | 8.0 | 4.5 | 16.0 | 10.5 | 11.4 | 7.5 |
| 1-G | −18.2 → | −7.2 → / ← −19.6 | ← 70.5 | ← 93.8 | ← 103.1 | 6.0 | 2.7 | 14.8 | 12.3 | 9.9 | 8.7 |
| 1-H | | −8.4 → / ← −17.3 | ← 63.6 | ← 75.4 | ← 84.9 | 7.7 | 3.2 | 17.2 | 12.7 | 12.9 | 9.9 |
| 1-I | −17.8 → | −7.2 → / ← −19.7 | ← 70.1 | ← 95.1 | ← 103.1 | 6.0 | 2.8 | 14.4 | 11.5 | 9.4 | 8.1 |

TABLE 1-continued

| L.C. | Phase transition temperature (°C.) | | | | | Ps (nC/cm²) | | ⓗ (DEG.) | | δ (DEG.) | |
|---|---|---|---|---|---|---|---|---|---|---|---|
| | Cryst | SmC* | SmA | Ch | Iso | 30° C. | 55° C. | 30° C. | 55° C. | 30° C. | 55° C. |
| 1-J | −17.8 ⇄ −19.8 | −7.2 ⇄ | ← 69.0 | ← 95.6 | ← 103.5 | 5.4 | 2.5 | 14.2 | 11.5 | 9.4 | 8.1 |
| 1-K | −18.6 ⇄ −20.0 | −7.1 ⇄ | ← 69.3 | ← 95.2 | ← 103.2 | 6.7 | 3.1 | 14.5 | 11.6 | 9.3 | 8.1 |
| 1-L | −18.1 ⇄ −19.7 | −6.9 ⇄ | ← 70.1 | ← 95.1 | ← 103.5 | 6.8 | 3.5 | 14.9 | 12.4 | 9.9 | 8.7 |
| 1-M | | −10.2 ⇄ −15.2 | ← 64.6 | ← 89.9 | ← 95.6 | 5.8 | 2.3 | 15.6 | 9.8 | 10.6 | 6.8 |
| 1-N | | −9.8 ⇄ −16.8 | ← 63.2 | ← 90.2 | ← 96.8 | 6.6 | 3.0 | 15.7 | 9.9 | 10.8 | 6.8 |
| 1-O | −19.2 ⇄ −20.0 | −6.5 ⇄ | ← 70.4 | ← 95.2 | ← 102.6 | 7.5 | 3.9 | 15.0 | 12.4 | 10.0 | 8.5 |
| 1-P | −18.4 ⇄ −24.1 | −8.8 ⇄ | ← 69.7 | ← 96.0 | ← 104.6 | 8.1 | 4.4 | 15.9 | 12.2 | 10.9 | 8.3 |
| 1-Q | | −8.4 ⇄ −10.4 | ← 70.1 | ← 94.8 | ← 102.6 | 6.0 | 2.2 | 15.4 | 10.7 | 10.7 | 7.2 |
| 1-R | | −6.3 ⇄ −11.6 | ← 65.4 | ← 90.0 | ← 97.7 | 8.6 | 5.2 | 16.4 | 12.0 | 11.3 | 8.0 |

Herein, the respective symbols in phase transition series represents the following phases:
Cryst: Crystal,
SmC*: chiral smectic C phase,
SmAa: smectic A phase,
Ch: cholesteric phase, and
Iso: Isotropic phase.

Two 1.1 mm-thick glass plates (diagonal distance: 14 in.) were provided as a pair of substrates and were respectively coated with transparent ITO stripe electrodes each having a side metal wire of molybdenum, followed by coating with a 1500 Å-thick tantalum oxide as a transparent dielectric film by sputtering.

A solution in NMP of a polyimide precursor ("LQ 1802" mfd. by Hitachi Kasei K.K.) was applied onto the tantalum oxide film and baked at 270° C. to form a 300 Å-thick polyimide alignment film. The baked film was then rubbed with acetate fiber planted cloth. A pretilt angle is set to 18 degrees by controlling rubbing conditions including a degree of pressing, rotation speed of a rubbing roller and a substrate feed velocity. Then, on one of the substrates, epoxy resin adhesive particles having an average particle size of 5.5 μm ("Torepearl" (trade name), available from Toray K.K.) were dispersed at a density of 50 particles/mm² by the Nord Son electrostatic dispersion method and, on the other substrate, silica micro-beads having an average particle size of 1.2–1.3 μm were dispersed at a density of 300 particles/mm² by the Knudsen electrostatic dispersion method. Then, a liquid adhesive ("Struct Bond" (trade name), mfd. by Mitsui Toatsu Kagaku K.K.) as a sealing member was applied by printing in a thickness of 6 μm. Then, the two glass plates were applied to each other so that their rubbed directions extended generally in the same direction but intersected each other at an intersection angle of 8 degrees, and bonded to each other by applying a pressure of 2.8 kg/cm² at 70° C. for 5 min, followed by further curing of the two types of adhesives under a pressure of 0.63 kg/cm³ at 150° C. for 4 hours to form a blank cell.

Then, blank cells prepared in the above described manner were respectively evacuated to a reduced pressure of $10^{-4}$ torr and then filled with liquid crystal compositions 1-A to 1-R, respectively, to prepare ferroelectric (chiral smectic) liquid crystal devices.

Each of the thus prepared liquid crystal devices was subjected to observation of an alignment characteristic within a cell at 30° C. and 55° C.

Figure 9:
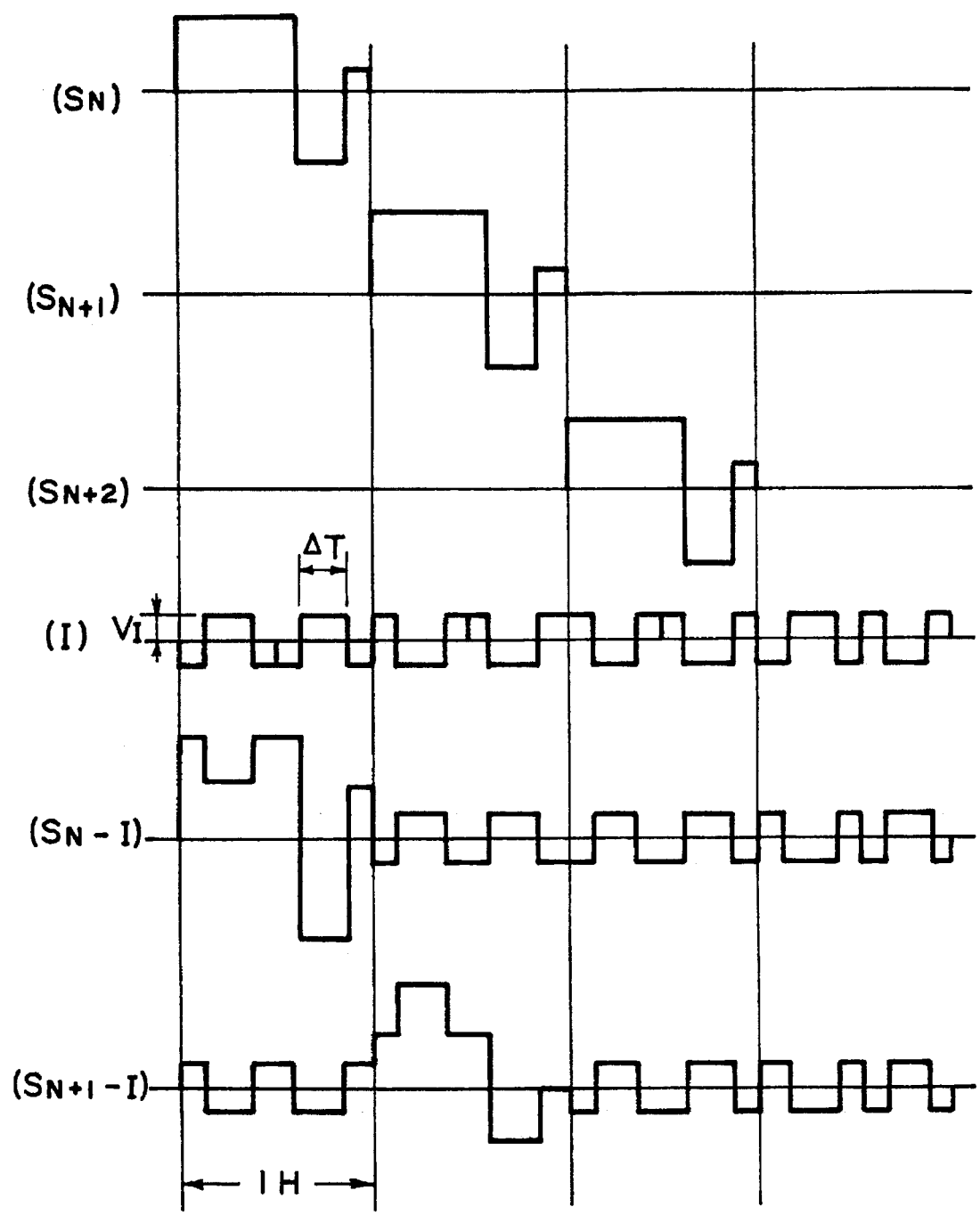
FIG. 9 is a waveform diagram illustrating driving waveforms used in an embodiment of the present invention.

The liquid crystal device was driven by applying the set of driving waveforms shown in FIG. 9 (⅓ bias ratio) to measure the driving voltage margin $\Delta V$ ($V_3-V_1$) at 55° C. while setting $\Delta t$ so as to provide $V_1 \approx 15$ volts. The liquid crystal device was also subjected to observation of alignment stability at 30° C. and 55° C.

Incidentally, referring to FIG. 9, at $S_N$, $S_{N+1}$ and $S_{N+2}$ are shown voltage waveforms applied to scanning lines and at I is shown a voltage waveform applied to a data line. At ($S_N-I$) and ($S_{N+1}-I$) are shown synthetic voltage waveforms applied to pixels at positions where the scanning liens (at $S_N$ and $S_{N+1}$) and the data line (at I) intersect each other, respectively.

The results are shown in Table 2 below.

Herein, evaluation of respective characteristics are made as follows:

Alignment Characteristic ("Alignment")

The alignment characteristic means an alignment state of the liquid crystal composition when the liquid crystal device is not driven.

o: C1 uniform alignment state.

x: Splay alignment state (other than C1 uniform alignment state).

Alignment Stability ("Stability")

The alignment stability means a stability of C1 uniform alignment state when the liquid crystal device is driven (i.e., alignment stability before and after switching of the liquid crystal molecules).

o: C1 uniform alignment state was kept.

x: Splay alignment state (other than C1 uniform alignment state) appeared by switching.

Parameter of Driving Voltage Margin ("ΔV Parameter")

The parameter of the driving voltage margin ΔV (=$V_3$−$V_1$) was determined by a value of: $(V_3-V_1)/(V_{3+V1})$. The larger value provides a more latitude in applied driving voltage.

Further, values of the physical parameters of: Ⓗ×δ and Ⓗ×δ/Ps were also shown in the following Table 2.

composition 1-C also did not satisfy the relationships (I) (the latter one) and (II).

EXAMPLE 2

A liquid crystal composition 2-A was prepared by including at least one mesomorphic compound of the formula below as a main component:

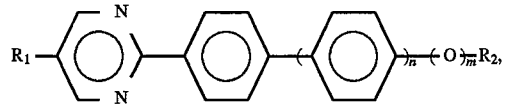

wherein $R_1$ and $R_2$ each is a linear or branched alkyl group, and n and m each is 0 or 1.

More specifically, the composition 2-A was prepared by mixing the following compounds in the indicated proportions.

TABLE 2

| | At 30° C. | | At 55° C. | | | | | | |
|---|---|---|---|---|---|---|---|---|---|
| L.C. | Alignment/θa (DEG.) | Driving | Alignment/θa (DEG.) | Driving | Set ΔT (μsec) | ΔV (V) | ΔV parameter | Ⓗ × δ | Ⓗ × δ/Ps |
| 1-A | o/11.5 | o | o/9.4 | o | 12.4 | 3.8 | 0.112 | 119.0 | 26.5 |
| 1-B | x/12.9 | x | o/9.3 | o | 14.1 | 5.2 | 0.148 | 213.3 | 42.6 |
| 1-C | x/11.9 | x | o/10.6 | x | — | — | — | 147.3 | 16.4 |
| 1-D | o/11.5 | o | o/9.6 | o | 14.6 | 6.0 | 0.167 | 117.1 | 35.5 |
| 1-E | o/10.8 | o | o/7.6 | o | 14.2 | 2.5 | 0.077 | 78.8 | 30.3 |
| 1-F | o/12.1 | o | o/7.4 | x | — | — | — | 78.8 | 17.5 |
| 1-G | o/10.9 | o | o/8.6 | o | 13.3 | 5.1 | 0.148 | 107.0 | 39.6 |
| 1-H | o/14.0 | o | 0/9.0 | o | 20.3 | 6.8 | 0.185 | 125.7 | 39.3 |
| 1-I | o/10.5 | o | o/8.1 | o | 12.1 | 3.6 | 0.107 | 93.2 | 33.3 |
| 1-J | o/10.6 | o | o/8.1 | o | 13.3 | 3.8 | 0.110 | 93.2 | 37.3 |
| 1-K | o/10.9 | o | 0/8.0 | o | 11.1 | 3.5 | 0.104 | 94.0 | 30.3 |
| 1-L | o/11.2 | o | o/8.8 | o | 11.0 | 4.0 | 0.118 | 107.3 | 30.6 |
| 1-M | o/11.7 | o | o/6.6 | x | — | — | — | 66.6 | 29.0 |
| 1-N | o/11.8 | o | o/6.6 | x | — | — | — | 67.3 | 22.4 |
| 1-O | o/11.2 | o | o/8.8 | o | 10.6 | 3.4 | 0.102 | 105.4 | 27.0 |
| 1-P | o/11.9 | o | o/8.5 | o | 10.3 | 1.6 | 0.051 | 101.3 | 23.0 |
| 1-Q | o/11.6 | o | o/7.4 | o | 16.1 | 2.4 | 0.074 | 77.0 | 35.0 |
| 1-R | o/12.3 | o | o/8.4 | x | — | — | — | 96.0 | 18.5 |

As apparent from the above Table 2, the liquid crystal devices using the liquid crystal compositions (1-A, 1-B, 1-D, 1-E, 1-G to 1-L, and 1-O to 1-Q) satisfying the relationships (III) and (IV) (i.e., Ⓗ×δ>70 ... (III), and Ⓗ×δ/Ps>20 ... (IV)) ensured a wider driving voltage margin at 55° C.

The liquid crystal devices using the liquid crystal compositions (1-A, 1-B, 1-D, 1-G to 1-L, and 1-O) satisfying the relationships (V) nd (VI) (i.e., Ⓗ×δ>90 ... (V) and Ⓗ×δ/Ps>25 ... (VI)) also ensured a sufficient driving voltage margin (i.e., above 3.4 V) at 55° C. allowing actual driving even at high temperature.

The liquid crystal device using the liquid crystal composition 1-B provided a wider driving voltage margin at 55° C. but failed to provide a uniform alignment state at 30° C. because the composition 1-B did not satisfy the relationships (I) (the latter one) and (II) at 30° C. (i.e., δ<α. .. (I), Ⓗ>θa>Ⓗ/2 ... (II)). Further, the liquid crystal device using the liquid crystal composition 1-C also failed to provide a uniform alignment state at 30° C. because the

| Structural Formula | wt. parts |
|---|---|
| $C_8H_{17}$—⟨N-ring-N⟩—⟨ring⟩—O—$C_{10}H_{21}$ | 7 |
| $C_7H_{15}$—⟨N-ring-N⟩—⟨ring⟩—O—$C_9H_{19}$ | 7 |
| $C_{10}H_{21}$—⟨N-ring-N⟩—⟨ring⟩—O—$C_8H_{17}$ | 7 |

| Structural Formula | wt. parts |
|---|---|
| C₁₀H₂₁–[pyridine]–[phenyl]–O–CH₂–*CH(F)–C₈H₁₇ | 10 |
| C₇H₁₅–[pyridine]–[phenyl]–[phenyl]–O–C₅H₁₁ | 12 |
| C₇H₁₅–[pyridine]–[phenyl]–[phenyl]–O–C₇H₁₅ | 10 |
| C₈H₁₇–[phenyl]–[thiazole]–[phenyl]–C₁₀H₂₁ | 6 |
| C₆H₁₃–[phenyl]–[thiazole]–[phenyl]–OC(O)–C₆H₁₃ | 4 |
| C₆H₁₃–[phenyl]–[thiazole]–[phenyl]–OC(O)–C₈H₁₇ | 6 |
| C₆H₁₃–[benzothiazole]–[phenyl]–O–C₈H₁₇ | 4 |
| C₁₁H₂₃–[pyridine]–[phenyl]–OC(O)–[thiophene]–C₄H₁₁ | 9 |
| C₄H₉–[benzoxazole]–[naphthalene]–O–C₁₀H₂₁ | 2 |

| Structural Formula | wt. parts |
|---|---|
| C₁₂H₂₅–[pyridine]–[phenyl]–OC(O)–[phenyl]–F | 3 |
| C₁₁H₂₃–[pyridine]–[phenyl]–OC(O)–[phenyl](F)–F | 2 |
| C₁₀H₂₁–[pyridine]–[phenyl]–(CH₂)₄–[thiophene] | 6 |
| C₁₀H₂₁–[pyridine]–[phenyl]–[O–CH(CH₃)–CH₂] (dihydrofuran) | 5 |

Liquid crystal compositions 2-B to 2-G were prepared by mixing a mesomorphic compound of the following formula:

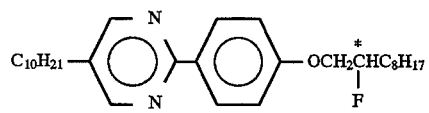

C₁₀H₂₁–[pyridine]–[phenyl]–OCH₂*CHC₈H₁₇
                                    |
                                    F with the above-prepared liquid crystal compositions in the ratios of 99:1 (for 2-B), 98:2 (for 2-C), 97:3 (for 2-D), 95:5 (for 2-E), 92:8 (for 2-F) and 90:10 (for 2-G) by weight.

The thus prepared liquid crystal compositions 2-A to 2-G showed physical properties shown in Table 3 below.

TABLE 3

| L.C. | Phase transition temperature (°C.) Cryst | SmC* | SmA | Ch | Iso | Ps (nC/cm²) 30° C. | 55° C. | Ⓗ (DEG.) 30° C. | 55° C. | δ (DEG.) 30° C. | 55° C. |
|---|---|---|---|---|---|---|---|---|---|---|---|
| 2-A | −21.2 → | −8.4 → / ← −22.3 | ← 68.1 | ← 92.0 | ← 100.6 | 6.3 | 2.9 | 15.0 | 12.2 | 10.2 | 8.8 |
| 2-B | −21.3 → | −8.0 → / ← −22.0 | ← 68.0 | ← 92.3 | ← 100.5 | 6.9 | 3.2 | 15.0 | 12.2 | 10.1 | 8.7 |
| 2-C | −22.1 → | −8.3 → / ← −23.0 | ← 67.6 | ← 91.8 | ← 100.0 | 7.4 | 3.5 | 14.9 | 12.1 | 10.2 | 8.9 |
| 2-D | −23.0 → | −6.7 → / ← −23.6 | ← 66.9 | ← 91.4 | ← 99.8 | 8.1 | 3.8 | 15.0 | 12.1 | 10.3 | 8.7 |
| 2-E | −21.3 → | −6.5 → / ← −24.0 | ← 65.8 | ← 91.0 | ← 100.1 | 9.6 | 4.6 | 15.1 | 12.3 | 10.2 | 8.8 |
| 2-F | −21.6 → | −6.0 → / ← −22.0 | ← 65.8 | ← 91.2 | ← 99.7 | 11.6 | 5.8 | 15.3 | 12.4 | 10.5 | 9.0 |
| 2-G | −21.5 → | −5.8 → / ← −21.0 | ← 64.8 | ← 90.8 | ← 98.9 | 13.1 | 7.2 | 15.4 | 12.5 | 10.9 | 9.2 |

Liquid crystal devices were prepared and evaluated in the same manner as in Example 1 except that the above-prepared liquid crystal compositions 2-A to 2-G were used. The results are shown in Table 4 below.

TABLE 4

| L.C. | At 30° C. Alignment/θa (DEG.) | Driving | At 55° C. Alignment/θa (DEG.) | Driving | Set ΔT (μsec) | ΔV (V) | ΔV parameter | Ⓗ × δ | Ⓗ × δ/Ps |
|---|---|---|---|---|---|---|---|---|---|
| 2-A | o/11.2 | o | o/8.4 | o | 17.1 | 6.0 | 0.167 | 107.4 | 37.0 |
| 2-B | o/11.0 | o | o/8.3 | o | 15.8 | 5.2 | 0.148 | 106.1 | 33.2 |
| 2-C | o/11.1 | o | o/8.2 | o | 14.4 | 4.2 | 0.123 | 107.7 | 30.8 |
| 2-D | o/11.2 | o | o/8.1 | o | 12.8 | 3.4 | 0.102 | 105.3 | 27.7 |
| 2-E | o/11.1 | o | o/8.1 | o | 10.6 | 1.5 | 0.048 | 108.2 | 23.5 |
| 2-F | o/11.0 | o | o/8.0 | x | — | — | — | 111.6 | 19.2 |
| 2-G | o/11.4 | o | o/8.2 | x | — | — | — | 115.0 | 16.0 |

As apparent from the above Tables 3 and 4, a driving voltage margin ΔV at 55° C. was decreased with an increase in Ps (i.e., decreased in Ⓗ×δ/Ps), even when the values of product of tilt angle Ⓗ by pretilt angle a (i.e., Ⓗ×δ) were comparable, respectively.

The liquid crystal devices using the liquid crystal compositions (2-A to 2-E) satisfying the relationships (III) and (IV) (i.e., Ⓗ×δ>70 ... (III), and Ⓗ×δ/Ps>20 ... (IV)) ensured a wider driving voltage margin at 55° C.

The liquid crystal devices using the liquid crystal compositions (2-A to 2-D) satisfying the relationships (V) and (VI) (i.e., Ⓗ×δ>90 ... (V), and Ⓗ×δ/Ps>25 ... (VI)) also ensured a sufficient driving voltage margin (i.e., above 3.4 V) at 55° C. allowing actual driving even at high temperature.

EXAMPLE 3

A liquid crystal composition 2-A was prepared by including at least one mesomorphic compound of the formula below as a main component:

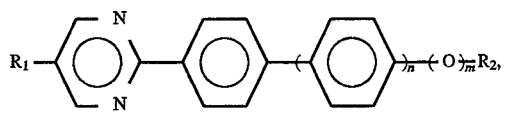

wherein $R_1$ and $R_2$ each is a linear or branched alkyl group, and n and m each is 0 or 1.

Liquid crystal compositions 3-A to 3-D were prepared by mixing a mesomorphic compound of the following formula:

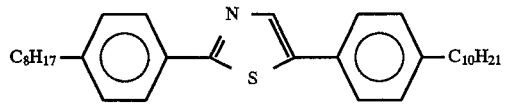

with the above-prepared liquid crystal compositions in the ratios of 98:2 (for 3-A), 97:3 (for 3-B), 94:6 (for 3-C), and 91:9 (for 3-D) by weight.

The thus prepared liquid crystal compositions 2-A, 3-A to 3-D showed physical properties shown in Table 5 below.

The liquid crystal devices using the liquid crystal compositions (2-A, 3-A and 3-B) satisfying the relationships (V)

TABLE 5

| L.C. | Phase transition temperature (°C.) | | | | | Ps (nC/cm$^2$) | | (H) (DEG.) | | δ (DEG.) | |
|---|---|---|---|---|---|---|---|---|---|---|---|
| | Cryst | SmC* | SmA | Ch | Iso | 30° C. | 55° C. | 30° C. | 55° C. | 30° C. | 55° C. |
| 2-A | −21.2 → ← −22.3 | −8.4 → | ← 68.1 | ← 92.0 | ← 100.6 | 6.3 | 2.9 | 15.0 | 12.2 | 10.2 | 8.8 |
| 3-A | −21.2 → ← −23.0 | −9.5 → | ← 67.9 | ← 93.1 | ← 100.9 | 5.7 | 2.6 | 14.2 | 11.5 | 9.4 | 8.3 |
| 3-B | −21.2 → ← −22.9 | −10.4 → | ← 67.6 | ← 93.7 | ← 101.4 | 5.5 | 2.4 | 13.9 | 10.8 | 9.0 | 7.8 |
| 3-C | −21.2 → ← −23.5 | −10.4 → | ← 66.8 | ← 94.6 | ← 101.7 | 5.0 | 2.0 | 13.0 | 10.4 | 8.1 | 7.3 |
| 3-D | −23.0 → ← −22.8 | −9.8 → | ← 65.6 | ← 94.6 | ← 102.5 | 4.2 | 1.6 | 12.1 | 9.2 | 7.8 | 6.6 |

Liquid crystal devices were prepared and evaluated in the same manner as in Example 1 except that the above-prepared liquid crystal compositions 2-A, 3-A to 3-D were used.

The results are shown in Table 6 below.

and (VI) (i.e., (H)×δ>90 ... (V), and (H)×δ/Ps>25 ... (VI)) also ensured a sufficient driving voltage margin (i.e., above 3.4 V) at 55° C. allowing actual driving even at high temperature.

TABLE 6

| | At 30° C. | | At 55° C. | | | | | | |
|---|---|---|---|---|---|---|---|---|---|
| L.C. | Alignment/θa (DEG.) | Driving | Alignment/θa (DEG.) | Driving | Set ΔT (μsec) | ΔV (V) | ΔV parameter | (H) × δ | (H) × δ/Ps |
| 2-A | o/11.2 | o | o/8.4 | o | 17.1 | 6.0 | 0.167 | 107.4 | 37.0 |
| 3-A | o/10.5 | o | o/8.0 | o | 13.1 | 3.5 | 0.104 | 95.5 | 36.7 |
| 3-B | o/10.4 | o | o/7.6 | o | 11.0 | 2.4 | 0.074 | 84.2 | 35.1 |
| 3-C | o/9.9 | o | o/7.2 | o | 9.2 | 6.9 | 0.029 | 75.9 | 38.0 |
| 3-D | o/8.5 | o | o/6.4 | x | — | — | — | 60.7 | 38.0 |

As apparent from the above Tables 5 and 6, a driving voltage margin ΔV at 55° C. was decreased with decrease in (H)×δ even when the values of (H)×δ/Ps were comparable, respectively.

As apparent from the above Table 2, the liquid crystal devices using the liquid crystal compositions 2-A, 3-A to 3-C) satisfying the relationships (III) and (IV) (i.e., (H)×δ>70 ... (III), and (H)×δ/Ps>20 ... (IV)) ensured a wider driving voltage margin at 55° C.

EXAMPLE 4

Liquid crystal devices were prepared and evaluated in the same manner as in Example 1 except that the liquid crystal compositions 1-A, 1-B, 1-D, 1-I, 1-P, 1-Q and 1-R were used and that an intersection angle and a pretilt angle were set to 6 degrees and 16 degrees, respectively.

The results are shown in the following Table 7.

TABLE 7

| | At 30° C. | | At 55° C. | | | | |
|---|---|---|---|---|---|---|---|
| L.C. | Alignment/θa (DEG.) | Driving | Alignment/θa (DEG.) | Driving | Set ΔT (μsec) | ΔV (V) | ΔV parameter |
| 1-A | o/11.5 | o | o/9.4 | o | 12.8 | 4.0 | 0.118 |
| 1-B | x/12.9 | x | o/9.3 | o | 14.2 | 5.4 | 0.153 |
| 1-D | o/11.5 | o | o/9.6 | o | 15.0 | 6.2 | 0.171 |
| 1-I | o/10.5 | o | o/8.1 | o | 12.5 | 3.6 | 0.107 |
| 1-P | o/11.9 | o | o/8.5 | o | 10.1 | 1.4 | 0.045 |
| 1-Q | o/11.6 | o | o/7.4 | o | 16.0 | 2.4 | 0.074 |
| 1-R | /12.3 | o | o/8.4 | x | — | — | — |

As apparent from the above Table 7, the liquid crystal devices using the liquid crystal compositions (1-A, 1-B, 1-D, 1-I, 1-P, and 1-Q) satisfying the relationships (III) and (IV) (i.e., (H)×δ>70 ... (III), and (H)×δ/Ps>20 ... (IV)) ensured a wider driving voltage margin at 55° C. even when the cell structure was changed.

The liquid crystal devices using the liquid crystal compositions (1-A, 1-B, 1-D and 1-I) satisfying the relationships (V) and (VI) (i.e., (H)×δ>90 ... (V) and (H)×δ/Ps>25 ... (VI)) also ensured a sufficient driving voltage margin (i.e., above 3.4 V) at 55° C. allowing practical driving even at high temperature.

The liquid crystal device using the liquid crystal composition 1-B provided a wider driving voltage margin at 55° C. but failed to provide a uniform alignment state at 30° C. because the composition 1-B did not satisfy the relationships (I) (the latter one) and (II) at 30° C. (i.e., δ<α ... (I), (H)>θa>(H)/2 ... (II)).

EXAMPLE 5

Figure 5A:
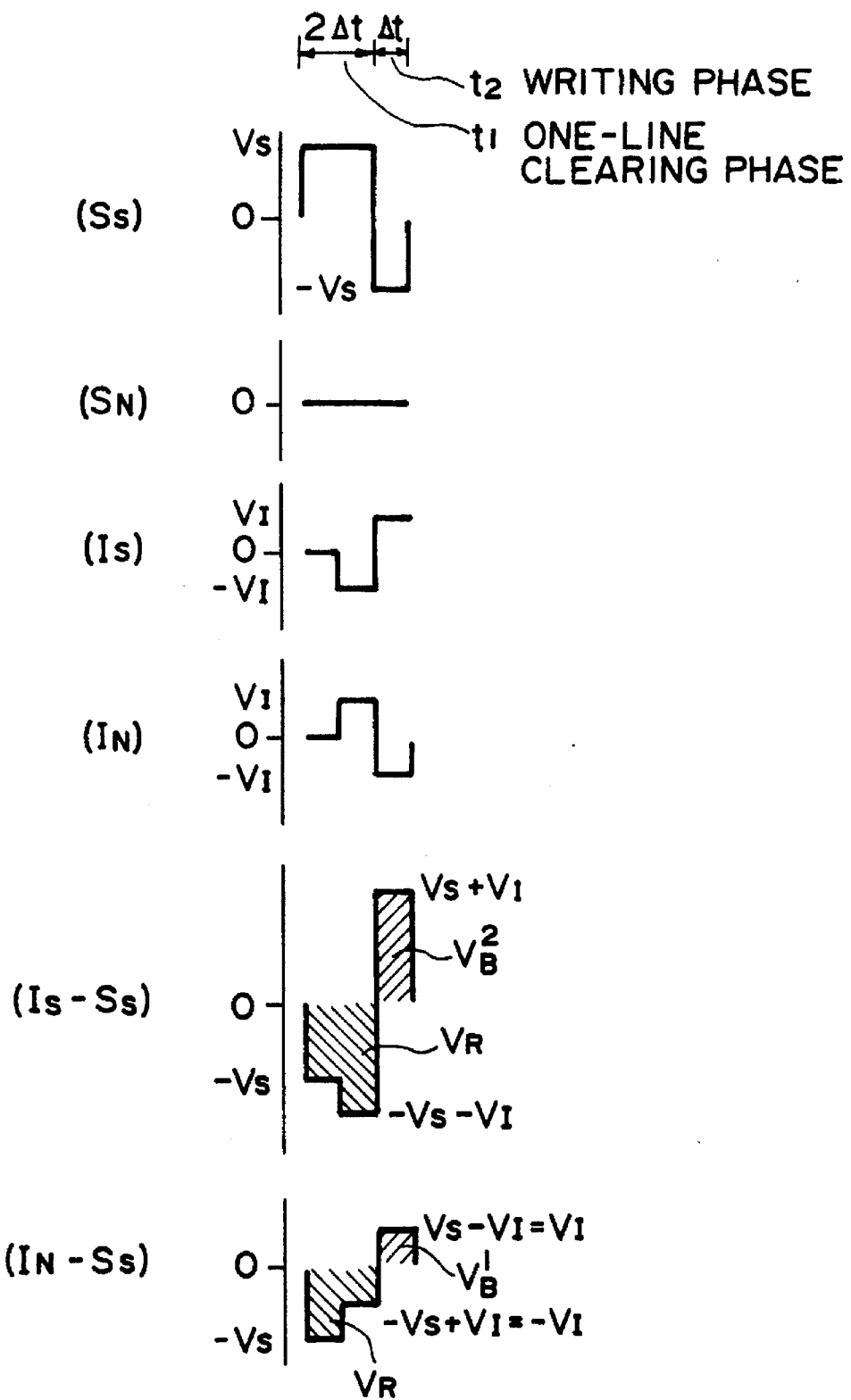
FIG. 5A shows unit driving waveforms used in an embodiment of the present invention and FIG. 5B is time-serial waveforms comprising a succession of such unit waveforms.
Figure 5B:
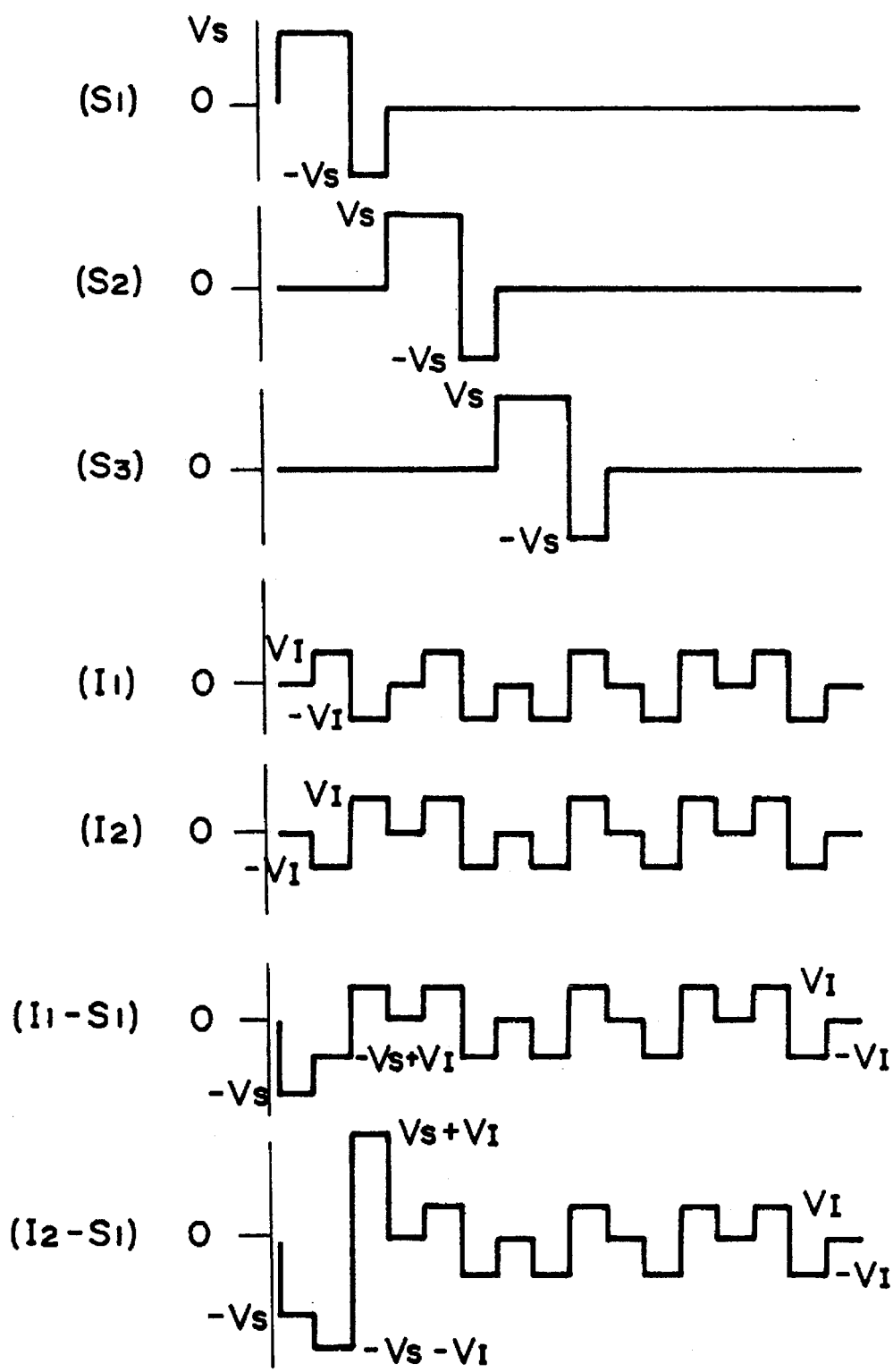
Figure 7:
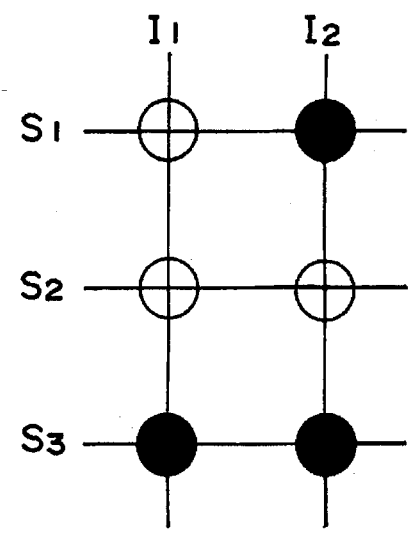
FIG. 7 is an illustration of a display pattern obtained by an actual drive using the time-serial waveforms shown in FIG. 5B.
Figure 8:
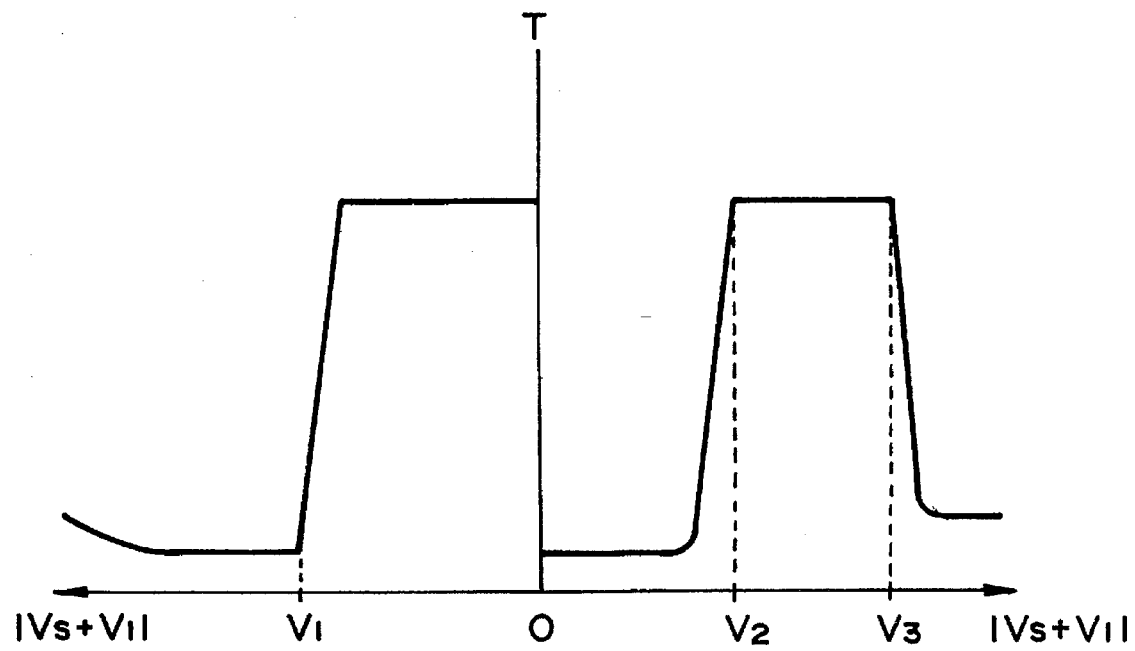
FIG. 8 is a V-T characteristic chart showing a change in transmittance under application of varying drive voltages.

The liquid crystal devices using the liquid crystal compositions 1-A to 1-R prepared in Example 1 were evaluated in the same manner as in Example 1 except that the liquid crystal devices were driven by applying the set of driving waveforms shown in FIGS. 5A and 5B instead of that shown in FIG. 9.

The results are shown in the following Table 8.

(I) (the latter one) and (II) at 30° C. (i.e., δ<α ... (I), (H)>θa>(H)/2 ... (II)). Further, the liquid crystal device using the liquid crystal composition 1-C also failed to provide a uniform alignment state at 30° C. because the composition 1-C also did not satisfy the relationships (I) (the latter one) and (II).

EXAMPLE 6

The liquid crystal compositions 1-D, 1-J, 1-K, 1-Q, 2-A and 3-D prepared in Examples 1–3 were subjected to measurement of tilt angle (H), inclination angle δ and spontaneous polarization Ps at 10° C., respectively.

The results are shown in Table 9 below.

TABLE 9

| | at 10° C. | | |
|---|---|---|---|
| L.C. | (H) (DEG.) | δ (DEG.) | Ps (nC/cm²) |
| 1-D | 15.0 | 8.6 | 8.7 |
| 1-J | 14.0 | 4.5 | 7.0 |
| 1-K | 14.1 | 6.8 | 8.9 |
| 1-Q | 14.8 | 5.9 | 7.9 |
| 2-A | 14.5 | 8.1 | 8.0 |
| 3-C | 12.6 | 4.0 | 6.5 |

The liquid crystal devices using the above liquid crystal compositions 1-D, 1-J, 1-K, 1-Q, 2-A and 3-D used in

TABLE 8

| | At 30° C. | | At 55° C. | | | | |
|---|---|---|---|---|---|---|---|
| L.C. | Alignment/θa (DEG.) | Driving | Alignment/θa (DEG.) | Driving | Set ΔT (μsec) | ΔV (V) | ΔV parameter |
| 1-A | o/11.5 | o | o/9.4 | o | 13.5 | 3.5 | 0.104 |
| 1-B | x/12.9 | x | o/9.3 | o | 15.0 | 5.2 | 0.148 |
| 1-C | x/11.9 | x | o/10.6 | x | — | — | — |
| 1-D | o/11.5 | o | o/9.6 | o | 14.8 | 5.8 | 0.162 |
| 1-E | o/10.8 | o | o/7.6 | o | 14.9 | 2.2 | 0.068 |
| 1-F | o/12.1 | o | o/7.4 | x | — | — | — |
| 1-G | o/10.9 | o | o/8.6 | o | 14.8 | 5.0 | 0.143 |
| 1-H | o/14.0 | o | 0/9.0 | o | 22.0 | 6.6 | 0.180 |
| 1-I | o/10.5 | o | o/8.1 | o | 13.0 | 3.4 | 0.102 |
| 1-J | o/10.6 | o | o/8.1 | o | 13.9 | 3.5 | 0.104 |
| 1-K | o/10.9 | o | o/8.0 | o | 12.0 | 3.5 | 0.102 |
| 1-L | o/11.2 | o | o/8.1 | o | 11.0 | 4.1 | 0.120 |
| 1-M | o/11.7 | o | o/6.6 | x | — | — | |
| 1-N | o/11.8 | o | o/6.6 | x | — | — | |
| 1-O | o/11.2 | o | o/8.8 | o | 11.0 | 3.5 | 0.107 |
| 1-P | o/11.9 | o | o/8.5 | o | 10.4 | 0.8 | 0.026 |
| 1-Q | o/11.6 | o | o/7.4 | o | 17.5 | 2.0 | 0.063 |
| 1-R | o/12.3 | o | o/8.4 | x | — | — | — |

As apparent from the above Table 8, the liquid crystal devices using the liquid crystal compositions (1-A, 1-B, 1-D, 1-E, 1-G to 1-L, and 1-O to 1-Q) satisfying the relationships (III) and (IV) (i.e., (H)×δ>70 ... (III), and (H)×δ/Ps>20 ... (IV)) ensured a wider driving voltage margin at 55° C. even when another set of driving waveforms was applied.

The liquid crystal devices using the liquid crystal compositions (1-A, 1-B, 1-D, 1-G to 1-L, and 1-O) satisfying the relationships (V) nd (VI) (i.e., (H)×δ>90 ... (V), and (H)×δ/Ps>25 ... (VI)) also ensured a sufficient driving voltage margin (i.e., above 3.4 V) at 55° C. allowing practical driving even at high temperature.

The liquid crystal device using the liquid crystal composition 1-B provided a wider driving voltage margin at 55° C. but failed to provide a uniform alignment state at 30° C. because the composition 1-B did not satisfy the relationships Examples 1–3 were subjected to observation of a change in C1 alignment state (switching characteristic) by driving the devices in the same manner as in Example 1 except that the value of $V_1$ as fixed at 15 V and 20 V, respectively, and that setting ΔT was varied.

The results are shown in the following Table 10.

TABLE 10

| L.C | Switching state | |
|---|---|---|
| | $V_1 = 15\ V$ | $V_1 = 20\ V$ |
| 1-D | o | o |
| 2-A | o | o |
| 1-K | o | Δ |
| 1-Q | o | Δ |
| 1-J | Δ | x |
| 3-C | x | x |

In the above Table 10, the respective marks o, Δ and x mean the following states.

o: C2 alignment state did not appeared even when setting ΔT was increased to a value 1.5 times ΔTmin (wherein Tmin means a minimum vale of ΔT allowing a stable switching between two stable states providing C1 uniform alignment).

Δ: C2 alignment state did not appeared at ΔTmin but C2 alignment state appeared when ΔT was increased to a value 1.5 times ΔTmin.

x: C2 alignment state appeared even at ΔTmin.

As apparent from the above Tables 9 and 10, the liquid crystal devices using the liquid crystal compositions 1-D, 2-A, 1-K and 1-Q each satisfying the relationship (VIII) (i.e., δ>$\widehat{H}$/3) caused no C2 alignment state when driven under condition of $V_1$=15 V at 10° C., thus showing a good switching characteristic.

Further, the liquid crystal devices using the liquid crystal compositions 1-D and 2-A each satisfying the relationship (IX) (i.e., δ>$\widehat{H}$/2) caused no C2 alignment state when driven under condition of $V_1$=20 V at 10° C.

On the other hand, the liquid crystal devices using the liquid crystal compositions 1-J and 3-C each not satisfying the relationship (VIII) (i.e., δ>$\widehat{H}$/3) caused C2 alignment state even when driven under condition of $V_1$=15 V at 10° C., thus failing to perform a good switching.

COMPARATIVE EXAMPLE 1

The liquid crystal compositions 1-B and 1-C prepared in Examples 1 were subjected to measurement of tilt angle $\widehat{H}$, inclination angle δ and spontaneous polarization Ps at 45° C., respectively.

The results are shown in Table 11 below.

TABLE 11

| | at 45° C. | | |
|---|---|---|---|
| L.C. | $\widehat{H}$ (DEG.) | δ (DEG.) | Ps (nC/cm²) |
| 1-B | 21.5 | 15.6 | 16.0 |
| 1-C | 18.6 | 14.5 | 15.5 |

The liquid crystal devices using the liquid crystal compositions 1-B and 1-C used in Example 1 were subjected to evaluation of alignment stability at 45° C. in the same manner as in Example 1.

As a result, the two liquid crystal devices caused considerable spray alignment state, thus failing to provide a wider driving voltage margin. This is presumably because the liquid crystal compositions 1-B and 1-C each failed to satisfy the relationship (VII) (i.e., $\widehat{H}$(18 degrees in this case)).

As described hereinabove, according to the present invention, there is provided a liquid crystal device using a chiral smectic liquid crystal providing physical parameters satisfying the relationships (I) to (IV), preferably further satisfying the relationships (V) to (IX). The liquid crystal device realized a stable C1 uniform alignment state in a practical temperature range of 10°–55° C. and provided a sufficient driving voltage margin for practical driving. The liquid crystal device can be expected to be effective for providing a large area-display apparatus showing high contrast and good images over the entire display area.

What is claimed is:

1. A liquid crystal device, comprising: a pair of substrates and a chiral smectic liquid crystal disposed between the pair of substrates, each of the pair of substrates having thereon an electrode for applying a voltage to the liquid crystal, the pair of substrates being provided with respective uniaxial alignment axes extending in directions which are parallel to each other or intersect each other at a prescribed angle, wherein the chiral smectic liquid crystal is placed in such an alignment state that the liquid crystal assumes at least two stable states and provides a pretilt angle α (degrees), a tilt angle $\widehat{H}$ (degrees), an inclination angle δ (degrees) of the liquid crystal layer, and an apparent tilt angle θa satisfying the following relationships (I) and (II) in a temperature range of 10°–55° C.:

$$\widehat{H} < \alpha + \delta \text{ and } \delta < \alpha \quad \text{(I),}$$

$$\widehat{H} > \theta a > \widehat{H}/2 \quad \text{(II); and}$$

the liquid crystal provides a tilt angle $\widehat{H}$ (degrees), an inclination angle δ (degrees) of the liquid crystal layer, and a spontaneous polarization Ps (nC/cm²) satisfying the following relationships (III) and (IV) at 55° C.:

$$\widehat{H} \times \delta > 70 \quad \text{(III),}$$

$$\widehat{H} \times \delta/Ps > 20 \ (\text{deg.}^2\text{cm}^2/\text{nC}) \quad \text{(IV).}$$

2. A device according to claim 1, wherein the liquid crystal provides a tilt angle $\widehat{H}$ (degrees), an inclination angle δ (degrees) of the liquid crystal layer, and a spontaneous polarization Ps (nC/cm²) satisfying the following relationships (V) and (VI) at 55° C.:

$$\widehat{H} \times \delta > 90 \quad \text{(V),}$$

$$\widehat{H} \times \delta/Ps > 25 \ (\text{deg.}^2\text{cm}^2/\text{nC}) \quad \text{(VI).}$$

3. A device according to claim 1 or 2, wherein the liquid crystal exhibits smectic A phase and chiral smectic C phase and has a phase transition temperature from smectic A phase to chiral smectic C phase of at least 60° C.

4. A device according to claim 3, wherein the liquid crystal provides a tilt angle $\widehat{H}$ (degrees) and a pretilt angle α (degrees) satisfying the following relationship (VII) in a temperature range of 10°–55° C.:

$$\widehat{H} < \alpha \quad \text{(VII).}$$

5. A device according to claim 4, wherein the liquid crystal provides a tilt angle $\widehat{H}$ (degrees) and an inclination angle δ (degrees) of the liquid crystal layer satisfying the following relationship (VIII) at 10° C.:

$$\delta > \widehat{H}/3 \quad \text{(VIII).}$$

6. A device according to claim 3, wherein the liquid crystal provides a tilt angle $\widehat{H}$ (degrees) and an inclination angle δ (degrees) of the liquid crystal layer satisfying the following relationships (V) and (VIII) at 10° C.:

$$\delta > \textcircled{H}/3 \qquad (VIII)$$

7. A device according to claim 3, wherein the liquid crystal provides a tilt angle $\textcircled{H}$ (degrees) and an inclination angle δ (degrees) of the liquid crystal layer satisfying the following relationship (IX) at 10° C.:

$$\delta > \textcircled{H}/2 \qquad (IX)$$

8. A device according to claim 4, wherein the liquid crystal provides a tilt angle $\textcircled{H}$ (degrees) and an inclination angle δ (degrees) of the liquid crystal layer satisfying the following relationships (V) and (IX) at 10° C.:

$$\delta > \textcircled{H}/2 \qquad (IX)$$

9. A device according to claim 1 or 2, wherein the liquid crystal provides a tilt angle $\textcircled{H}$ (degrees) and an inclination angle δ (degrees) of the liquid crystal layer satisfying the following relationships (V) and (IX) at 10° C.:

$$\delta > \textcircled{H}/2 \qquad (IX)$$

10. A device according to claim 1 or 2, wherein the liquid crystal provides a tilt angle $\textcircled{H}$ (degrees) and an inclination angle δ (degrees) of the liquid crystal layer satisfying the following relationship (VIII) at 10° C.:

$$\delta > \textcircled{H}/3 \qquad (VIII)$$

11. A device according to claim 1, wherein at least one of the pair of substrates is provided with an alignment film obtained from a polyamide acid represented by the following formula:

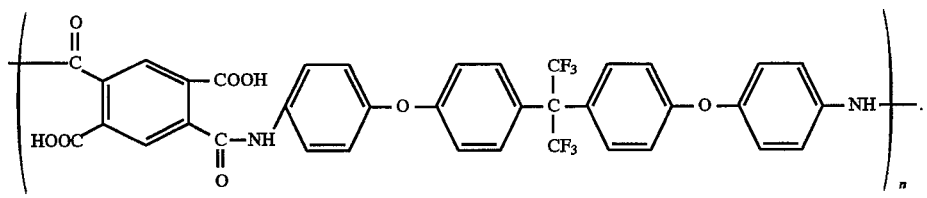

12. A device according to claim 1, wherein the liquid crystal comprises at least one mesomorphic compound represented by the following formula:

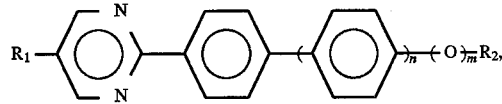

wherein $R_1$ and $R_2$ are independently a linear or branched alkyl group, and n and m are independently 0 or 1.

* * * * *

UNITED STATES PATENT AND TRADEMARK OFFICE
CERTIFICATE OF CORRECTION

PATENT NO. : 5,629,788

DATED : May 13, 1997

INVENTOR(S) : SHOSEI MORI ET AL.

It is certified that error appears in the above-identified patent and that said Letters Patent is hereby corrected as shown below:

On the title page: Item [54] and Column 1, line 3,

"ANGLE INCLINATION" SHOULD READ --ANGLE, INCLINATION--.

COLUMN 1

Line 2, "ANGLE INCLINATION" SHOULD READ
--ANGLE, INCLINATION--.
Line 28, "application" should read --applications--.
Line 64, "is" should read --are--.

COLUMN 2

Line 31, "to" should read --to the fact that--.

COLUMN 3

Line 9, "duration At" should read --duration $\Delta\tau$--.

COLUMN 4

Line 56, "it has been clarified that" should be deleted.

COLUMN 5

Line 31, "angle a" should read --angle $\alpha$--.
Line 52, "angle a" should read --angle $\alpha$--.

UNITED STATES PATENT AND TRADEMARK OFFICE
CERTIFICATE OF CORRECTION

PATENT NO. : 5,629,788

DATED : May 13, 1997

INVENTOR(S): SHOSEI MORI ET AL.

It is certified that error appears in the above-identified patent and that said Letters Patent is hereby corrected as shown below:

COLUMN 6

Line 9, "angle $\delta a$" should read --angle $\theta a$--.
    Line 58, "has come hard" should read --is difficult--.
    Line 62, "accomplished" should read --solved--.
    Line 67, "over" should read --even--.

COLUMN 8

Line 49, "(IV)" should read --(IV))--.
    Line 51, "(i)" should read --(I)-- and
      "(II)" should read --(II))--.

COLUMN 9

Line 2, "aobut" should read --about--.
    Line 9, "on condition that" should read --when--.

COLUMN 11

Line 18, "angle 6" should read -- angle $\delta$--.

COLUMN 12

Line 21, "comprises" should read --comprise--.

COLUMN 14

Line 27, "Co." should read --Co.)--.
    Line 28, ")" should be deleted.

UNITED STATES PATENT AND TRADEMARK OFFICE
CERTIFICATE OF CORRECTION

PATENT NO. : 5,629,788

DATED : May 13, 1997

INVENTOR(S): SHOSEI MORI ET AL.

It is certified that error appears in the above-identified patent and that said Letters Patent is hereby corrected as shown below:

COLUMN 15

Line 37, "represents" should read --represent--.
Line 40, "SmAa:" should read --SmA:--.

COLUMN 16

Line 57, "liens" should read --lines--.

COLUMN 17

Line 18, "$(V_3-V_1)/(V_{3+v1})$." should read --$(V_3-V_1)/(V_3+V_1)$.--
Line 19, "more" should read --greater--.
Line 22, "were" should read --are--.
Line 56, "nd" should read --and--.

COLUMN 21

Line 50, "angle a" should read --angle $\alpha$--.

COLUMN 23

Table 6, "6.9" should read --0.9--.
Line 41, "Table 2," should read --Table 6,--.
Line 48, "2-A," should read --(2-A,--.

UNITED STATES PATENT AND TRADEMARK OFFICE
CERTIFICATE OF CORRECTION

PATENT NO. : 5,629,788

DATED : May 13, 1997

INVENTOR(S): SHOSEI MORI ET AL.

It is certified that error appears in the above-identified patent and that said Letters Patent is hereby corrected as shown below:

COLUMN 25

Table 8, "0.120   should read --0.120
                                -
                                -
              0.107"              0.107--.
    Line 60, "nd" should read --and--.

COLUMN 27

Line 16, "appeared" should read --appear--.
    Line 18, "vale" should read --value--.
    Line 21, "appeared" should read --appear--.
    Line 43, "Examples 1" should read --Example 1--.
    Line 64, "Ⓗ" should read --Ⓗ<α--.

UNITED STATES PATENT AND TRADEMARK OFFICE
CERTIFICATE OF CORRECTION

PATENT NO. : 5,629,788

DATED : May 13, 1997

INVENTOR(S) : SHOSEI MORI ET AL.

It is certified that error appears in the above-identified patent and that said Letters Patent is hereby corrected as shown below:

COLUMN 29

```
Line 2,  "relationships (V) and" should read
         --relationship--.
Line 15, "relationships (V) and" should read
         --relationship--.
Line 33, "relationships (V) and" should read
         --relationship--.
```

Signed and Sealed this

Eleventh Day of November, 1997

Attest:

BRUCE LEHMAN

Attesting Officer

Commissioner of Patents and Trademarks